(12) United States Patent
Zhang et al.

(10) Patent No.: US 10,608,839 B2
(45) Date of Patent: Mar. 31, 2020

(54) RESOURCE SCHEDULING METHOD AND APPARATUS IN DSL SYSTEM, AND SYSTEM

(71) Applicant: HUAWEI TECHNOLOGIES CO., LTD., Shenzhen (CN)

(72) Inventors: Nan Zhang, Beijing (CN); Yixian Liu, Shenzhen (CN); Zhiqiang Yao, Xiangtan (CN); Zhiquan Luo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 16/053,826

(22) Filed: Aug. 3, 2018

(65) Prior Publication Data
US 2018/0343144 A1 Nov. 29, 2018

Related U.S. Application Data

(63) Continuation of application No. PCT/CN2016/073366, filed on Feb. 3, 2016.

(51) Int. Cl.
*H04L 12/58* (2006.01)
*H04L 5/14* (2006.01)
(Continued)

(52) U.S. Cl.
CPC ........... *H04L 12/2894* (2013.01); *H04B 3/32* (2013.01); *H04L 5/1469* (2013.01); *H04L 12/2898* (2013.01); *H04M 11/062* (2013.01)

(58) Field of Classification Search
None
See application file for complete search history.

(56) References Cited

U.S. PATENT DOCUMENTS

2014/0254791 A1* 9/2014 Wei ...................... H04M 11/062
379/406.01
2015/0311949 A1 10/2015 Liu et al.
(Continued)

FOREIGN PATENT DOCUMENTS

CN 101094433 B 5/2010
CN 104054275 B 9/2015
(Continued)

OTHER PUBLICATIONS

ITU-T G.9701 Corrigendum 1, Series G: Transmission Systems and Media, Digital Systems and Networks Access networks—Metallic access networks Fast access to subscriber terminals (G.fast)—Physical layer specification, Nov. 2015, 328 pages.
(Continued)

*Primary Examiner* — Kevin C. Harper
*Assistant Examiner* — Derrick V Rose
(74) *Attorney, Agent, or Firm* — Kilpatrick Townsend & Stockton LLP

(57) ABSTRACT

A resource scheduling method and apparatus in a DSL system, and a system are provided, to reduce energy consumption of the DSL system. The method includes: determining, according to service traffic information of each subscriber line and transmission capability information of each subscriber line, a transmission opportunity initial value allocated to each subscriber line in a TDD frame; and according to the transmission opportunity initial value of each subscriber line, dividing the TDD frame into a normal operation interval and a discontinuous operation interval, determining a transmission opportunity occupied by each subscriber line in the normal operation interval, and determining a subscriber line group in the discontinuous operation interval and a transmission opportunity occupied by
(Continued)

each subscriber line group in the discontinuous operation interval.

20 Claims, 8 Drawing Sheets

(51) Int. Cl.
  H04B 3/32    (2006.01)
  H04L 12/28   (2006.01)
  H04M 11/06   (2006.01)

(56) References Cited

U.S. PATENT DOCUMENTS

2015/0381233 A1    12/2015  Goodson et al.
2017/0013616 A1*   1/2017   Wentink ............ H04W 72/0446
2018/0212647 A1    7/2018   Strobel et al.

FOREIGN PATENT DOCUMENTS

| | | | |
|---|---|---|---|
| CN | 105210359 | A  | 12/2015 |
| WO | 2014164854 | A1 | 10/2014 |
| WO | 2015058054 | A1 | 4/2015 |

OTHER PUBLICATIONS

Michael Timmers et al, G.fast: Evolving the Copper Access Network. IEEE Communications Magazine, Aug. 2013, vol. 51, No. 8, 6 pages.

Jochen Macs et al, Energy efficient discontinuous operation in vectored G.fast. 2014 IEEE International Conference on Communications (ICC), Aug. 28, 2014, 5 pages.

M. Guenach et al, Energy management of DSL systems: Experimental findings. 2013 IEEE Global Communications Conference (GLOBECOM), Jun. 12, 2014, 6 pages.

Chiang-Yu Chen et al, Optimized Resource Allocation for Upstream Vectored DSL Systems With Zero-Forcing Generalized Decision Feedback Equalizer. IEEE Journal of Selected Topics in Signal Processing, vol. 1, No. 4, Dec. 2007, 14 pages.

Beier Li et al, Dynamic partial crosstalk cancellation resource allocation algorithms for DSL access networks. EURASIP Journal on Advances in Signal Processing 2012, 2012:150, 14 pages.

George Ginis et al, Vectored Transmission for Digital Subscriber Line Systems. IEEE Journal on Selected Areas in Communications, vol. 20, No. 5, Jun. 2002, 20 pages.

* cited by examiner

RESOURCE SCHEDULING METHOD AND APPARATUS IN DSL SYSTEM, AND SYSTEM

CROSS-REFERENCE TO RELATED APPLICATIONS

This application is a continuation of International Application No. PCT/CN2016/073366, filed on Feb. 3, 2016, the disclosure of which is hereby incorporated by reference in its entirety.

TECHNICAL FIELD

The present invention relates to the field of communications technologies, and in particular, to a resource scheduling method and apparatus in a DSL system, and a system.

BACKGROUND

A digital subscriber line (DSL) technology is a high-speed transmission technology in which data is transmitted by using a telephone line, that is, an unshielded twisted pair (UTP). A DSL system has a plurality of DSL lines, a DSL access multiplexer (DSLAM) usually provides an access service for the plurality of DSL lines. The DSL line is also referred to as a subscriber line.

ITU-T Q4 uses time division duplexing (TDD) as a duplex manner of a next-generation copper wire broadband access standard Gfast. However, due to an electromagnetic induction principle, mutual interference, referred to as crosstalk, is generated between a plurality of signals that gain access to the DSLAM. As a frequency band used by Gfast becomes wider, far-end crosstalk (FEXT) more severely affects transmission performance of a line, and the crosstalk of a twisted pair is extremely strong at a high frequency. To cancel the crosstalk, a vectoring DSL technology may be used to cancel the far-end crosstalk.

For the vectoring technology, joint sending and joint receiving among lines are mainly performed at a DSLAM end to cancel FEXT interference by using a signal processing method, and finally the FEXT interference is canceled in each signal.

When the vectoring technology is used in a Gfast system, and a precoder coefficient does not change in a downstream direction, all subscriber lines in a vectoring group need to simultaneously perform signal sending, and when there is no service data to send on some of the subscriber lines, a precoder output signal still needs to be sent on those subscriber lines. When a backward canceller coefficient does not change in an upstream direction, all the subscriber lines in the vectoring group need to simultaneously perform signal receiving even though subscriber ends of some of the subscriber lines have no service data to send. In addition, the Gfast system is a high bandwidth system at a rate of 1 Gbps in a typical scenario. In an actual application, service data traffic of each subscriber line greatly changes. Due to a constraint of simultaneous joint sending and receiving, a large quantity of idle symbols are filled in a transmission timeslot of the system, and consequently, energy consumption is wasted.

SUMMARY

Embodiments of the present invention provide a resource scheduling method and apparatus in a DSL system, and a system, to reduce energy consumption of the DSL system.

Specific technical solutions provided in the embodiments of the present invention are as follows:

According to a first aspect, an embodiment of the present invention provides a resource scheduling method in a digital subscriber line DSL system, where the DSL system includes a network-side device and at least two subscriber lines, and the method includes:

determining, according to service traffic information of each subscriber line and transmission capability information of each subscriber line, a transmission opportunity initial value allocated to each subscriber line in a time division duplex TDD frame; and determining a group transmission solution according to the transmission opportunity initial value of each subscriber line; and the determining the group transmission solution includes:

dividing the TDD frame into a normal operation interval and a discontinuous operation interval, determining a transmission opportunity occupied by each subscriber line in the normal operation interval, and determining a subscriber line group in the discontinuous operation interval and a transmission opportunity occupied by each subscriber line group in the discontinuous operation interval, where each subscriber line meets a condition that a difference between a quantity of transmission opportunities allocated to the subscriber line and a transmission opportunity initial value allocated to the subscriber line falls within a preset range.

In this embodiment, the group transmission solution is dynamically determined by using the transmission opportunity initial value preallocated to the subscriber line as a constraint, conventional DSL resource scheduling in which only a physical layer parameter and an indicator are considered changes, and the upper-layer service traffic information and the transmission capability information are jointly considered, so that overall performance of the DSL system can be improved. In addition, the present invention can adjust the group transmission solution in real time according to a variation of the service traffic information, so that a quantity of sent symbols is directly proportional to data traffic, system energy efficiency is improved, and energy consumption of the DSL system is reduced.

In a possible implementation, the service traffic information includes at least one of or a combination of a cache queue depth, a service data arrival rate, or an amount of cached service data; and the transmission capability information includes at least a line rate.

In a possible implementation, the determining, according to service traffic information of each subscriber line and transmission capability information of each subscriber line, a transmission opportunity initial value allocated to each subscriber line in a time division duplex TDD frame includes:

for any subscriber line, determining a ratio of a service data arrival rate of the subscriber line to a line rate as a first ratio, determining a ratio of an amount of cached service data of the subscriber line to a cache queue depth as a second ratio, determining a first coefficient according to the first ratio and the second ratio, calculating a product of the obtained first coefficient and a total quantity of symbols included in the TDD frame, and determining, according to the product, a transmission opportunity initial value allocated to the subscriber line. In this embodiment, the determined transmission opportunity initial value of the subscriber line can adapt to a variation of a rate ratio and a variation of a cache ratio, and the transmission opportunity initial value of the subscriber line can be determined according to a requirement of the subscriber line.

In a possible implementation, the transmission opportunity initial value allocated to the subscriber line is not less than the product, and meets a system parameter constraint condition, where the system parameter constraint condition includes at least a minimum quantity of transmission opportunities. In this embodiment, the determined transmission opportunity initial value of the subscriber line can meet a basic requirement of the system.

In a possible implementation, the transmission capability information further includes a transmission correctness percentage; and the transmission opportunity initial value allocated to the subscriber line further includes a transmission opportunity required for data retransmission and determined according to the transmission correctness percentage.

In this embodiment, when the transmission opportunity initial value is determined, the transmission correctness percentage of the subscriber line is considered, so that data incorrectly transmitted can be retransmitted by using the transmission opportunity of the subscriber line.

In a possible implementation, the determining a group transmission solution according to the transmission opportunity initial value allocated to each subscriber line includes:

determining the transmission opportunity occupied by each subscriber line in the normal operation interval, and determining each subscriber line group in the discontinuous operation interval and the transmission opportunity occupied by each subscriber line group in the discontinuous operation interval, where the following conditions are met: a quantity of idle symbols that need to be filled in the TDD frame is smallest; power consumption of a vectoring processor VP chip in the TDD frame is smallest, and power consumption of the VP chip in the TDD frame at a single symbol location is directly proportional to a square of a quantity of subscriber lines that need to participate in transmission at the symbol location; and each subscriber line group performs time-sharing sending, and a combination of all the subscriber line groups occupies all symbol locations in the discontinuous operation interval.

In this embodiment, the idle symbols filled in the TDD frame are minimized, and the power consumption of the VP chip is minimized, so that total power consumption of the DSL system is minimized.

In a possible implementation, the method further includes:

if service traffic information of at least one subscriber line and/or transmission capability information of at least one subscriber line change/changes, determining, according to changed service traffic information of each subscriber line and changed transmission capability information of each subscriber line, a transmission opportunity initial value reallocated to each subscriber line in the TDD frame; and determining a group transmission solution after first adjustment according to the transmission opportunity initial value reallocated to each subscriber line; and the determining a group transmission solution after first adjustment includes: adjusting the transmission opportunity occupied by each subscriber line in the normal operation interval, to obtain a transmission opportunity occupied by each subscriber line in the normal operation interval after the first adjustment, and adjusting the transmission opportunity occupied by each subscriber line group in the discontinuous operation interval, to obtain a transmission opportunity occupied by each subscriber line group in the discontinuous operation interval after the first adjustment.

In this embodiment, the group transmission solution is dynamically adjusted according to a variation of the service traffic information and/or a variation of the transmission capability information of the subscriber line, so that the group transmission solution can adapt to the variation of the subscriber line.

In a possible implementation, the determining a group transmission solution after first adjustment includes:

keeping each subscriber line group unchanged, adjusting the transmission opportunity occupied by each subscriber line in the normal operation interval, to obtain the transmission opportunity occupied by each subscriber line in the normal operation interval after the first adjustment, and adjusting the transmission opportunity occupied by each subscriber line group in the discontinuous operation interval, to obtain the transmission opportunity occupied by each subscriber line group in the discontinuous operation interval after the first adjustment, where the following conditions are met: a quantity of idle symbols that need to be filled in the TDD frame after the first adjustment is smallest; power consumption of the vectoring processor VP chip in the TDD frame after the first adjustment is smallest, and power consumption of the VP chip in the TDD frame at a single symbol location is directly proportional to a square of a quantity of subscriber lines that need to participate in transmission at the symbol location, and for each subscriber line; a difference between a quantity of transmission opportunities allocated to the subscriber line after the first adjustment and a transmission opportunity initial value reallocated to the subscriber line falls within the preset range; and each subscriber line group performs time-sharing sending, and a combination of all the subscriber line groups after the first adjustment occupies all symbol locations in the discontinuous operation interval.

In this embodiment, the subscriber line group is kept unchanged during the first adjustment, so that the subscriber line group may be prevented from being frequently adjusted, calculation amount is reduced, and energy consumption is further reduced.

In a possible implementation, that a quantity of idle symbols that need to be filled in the TDD frame is smallest is specifically:

calculating a product of a transmission opportunity occupied by any subscriber line in the normal operation interval and a quantity of subscriber lines in the normal operation interval, to obtain a first result;

for each subscriber line group in the discontinuous operation interval, calculating a product of a transmission opportunity occupied by the subscriber line group in the discontinuous operation interval and a quantity of subscriber lines included in the subscriber line group, to obtain a second result; and calculating a sum of the second results corresponding to all the subscriber line groups to obtain a third result, and calculating a sum of the first result and the third result to obtain a fourth result, so that a difference between the fourth result and a total quantity of transmission opportunities allocated to all the subscriber lines is smallest, and the quantity of transmission opportunities allocated to the subscriber line is determined according to the transmission opportunity initial value allocated to the subscriber line.

In a possible implementation, that power consumption of a VP chip in the TDD frame is smallest is specifically:

calculating a product of a square of a total quantity of subscriber lines in the DSL system and a quantity of transmission opportunities occupied by any subscriber line in the normal operation interval, to obtain a fifth result;

for each subscriber line group in the discontinuous operation interval, calculating a product of a square of a quantity of subscriber lines included in the subscriber line group and a quantity of transmission opportunities occupied by the subscriber line group in the discontinuous operation interval, to obtain a sixth result; and calculating a sum of the sixth results corresponding to all the subscriber line groups to obtain a seventh result, so that a sum of the seventh result and the fifth result is smallest.

In a possible implementation, after the determining a group transmission solution after first adjustment according to the transmission opportunity initial value reallocated to each subscriber line, the method further includes:

if a DSL system performance indicator corresponding to the group transmission solution after the first adjustment is better than a preset performance indicator, accepting the group transmission solution after the first adjustment.

In a possible implementation, after the determining a group transmission solution after first adjustment according to the transmission opportunity initial value reallocated to each subscriber line, the method further includes:

determining whether a current time is in a time window in which the subscriber line group is prohibited from being adjusted; and if the current time is not in the time window, determining a group transmission solution after second adjustment according to the transmission opportunity initial value reallocated to each subscriber line; or if the current time is in the time window, accepting the group transmission solution after the first adjustment; and the determining a group transmission solution after second adjustment includes:

adjusting the transmission opportunity occupied by each subscriber line in the normal operation interval, to obtain a transmission opportunity occupied by each subscriber line in the normal operation interval after the second adjustment, adjusting the subscriber line group in the discontinuous operation interval, to obtain a subscriber line group in the discontinuous operation interval after the second adjustment, and adjusting the transmission opportunity occupied by each subscriber line group in the discontinuous operation interval, to obtain a transmission opportunity occupied by each subscriber line group in the discontinuous operation interval after the second adjustment.

In this embodiment, the time window in which the subscriber line group is prohibited from being adjusted is set, so that the subscriber line group is prevented from being frequently adjusted, and an objective of energy saving is further achieved.

In a possible implementation, after the determining a group transmission solution after first adjustment according to the transmission opportunity initial value reallocated to each subscriber line, before the determining whether a current time is in a time window in which the subscriber line group is prohibited from being adjusted, the method further includes:

determining that a DSL system performance indicator corresponding to the group transmission solution after the first adjustment is not better than a preset performance indicator.

In a possible implementation, after the determining a group transmission solution after second adjustment, the method further includes:

determining a better value from a DSL system performance indicator corresponding to the group transmission solution after the first adjustment and a DSL system performance indicator corresponding to the group transmission solution after the second adjustment, and accepting a group transmission solution corresponding to the better value.

According to a second aspect, an embodiment of the present invention further provides a resource scheduling apparatus in a digital subscriber line DSL system, where the DSL system includes a network-side device and at least two subscriber lines, and the apparatus includes:

an initial value determining module, configured to determine, according to service traffic information of each subscriber line and transmission capability information of each subscriber line, a transmission opportunity initial value allocated to each subscriber line in a time division duplex TDD frame; and a transmission solution determining module, configured to determine a group transmission solution according to the transmission opportunity initial value determined by the initial value determining module for each subscriber line; and the transmission solution determining module is configured to:

divide the TDD frame into a normal operation interval and a discontinuous operation interval, determine a transmission opportunity occupied by each subscriber line in the normal operation interval, and determine a subscriber line group in the discontinuous operation interval and a transmission opportunity occupied by each subscriber line group in the discontinuous operation interval, where each subscriber line meets a condition that a difference between a quantity of transmission opportunities allocated to the subscriber line and a transmission opportunity initial value allocated to the subscriber line falls within a preset range.

In this embodiment, the group transmission solution is dynamically determined by using the transmission opportunity initial value preallocated to the subscriber line as a constraint, conventional DSL resource scheduling in which only a physical layer parameter and an indicator are considered changes, and the upper-layer service traffic information and the transmission capability information are jointly considered, so that overall performance of the DSL system can be improved. In addition, the present invention can adjust the group transmission solution in real time according to a variation of the service traffic information, so that a quantity of sent symbols is directly proportional to data traffic, system energy efficiency is improved, and energy consumption of the DSL system is reduced.

In a possible implementation, the service traffic information includes at least one of or a combination of a cache queue depth, a service data arrival rate, or an amount of cached service data; and the transmission capability information includes at least a line rate.

In a possible implementation, the initial value determining module is configured to:

for any subscriber line, determine a ratio of a service data arrival rate of the subscriber line to a line rate as a first ratio, determine a ratio of an amount of cached service data of the subscriber line to a cache queue depth as a second ratio, determine a first coefficient according to the first ratio and the second ratio, calculate a product of the obtained first coefficient and a total quantity of symbols included in the TDD frame, and determine, according to the product, a transmission opportunity initial value allocated to the subscriber line. In this embodiment, the determined transmission opportunity initial value of the subscriber line can adapt to a variation of a rate ratio and a variation of a cache ratio, and the transmission opportunity initial value of the subscriber line can be determined according to a requirement of the subscriber line.

In a possible implementation, the initial value determining module is configured to: determine that the transmission opportunity initial value allocated to the subscriber line is not less than the product, and meets a system parameter constraint condition, where the system parameter constraint condition includes at least a minimum quantity of transmission opportunities. In this embodiment, the determined transmission opportunity initial value of the subscriber line can meet a basic requirement of the system.

In a possible implementation, the transmission capability information further includes a transmission correctness percentage; and the transmission opportunity initial value allocated to the subscriber line further includes a transmission opportunity required for data retransmission and determined according to the transmission correctness percentage. In this embodiment, when the transmission opportunity initial value is determined, the transmission correctness percentage of the subscriber line is considered, so that data incorrectly transmitted can be retransmitted by using the transmission opportunity of the subscriber line.

In a possible implementation, the transmission solution determining module is configured to:

determine the transmission opportunity occupied by each subscriber line in the normal operation interval, and determine each subscriber line group in the discontinuous operation interval and the transmission opportunity occupied by each subscriber line group in the discontinuous operation interval, where the following conditions are met: a quantity of idle symbols that need to be filled in the TDD frame is smallest: power consumption of a vectoring processor VP chip in the TDD frame is smallest, and power consumption of the VP chip in the TDD frame at a single symbol location is directly proportional to a square of a quantity of subscriber lines that need to participate in transmission at the symbol location; and each subscriber line group performs time-sharing sending, and a combination of all the subscriber line groups occupies all symbol locations in the discontinuous operation interval.

In this embodiment, the idle symbols filled in the TDD frame are minimized, and the power consumption of the VP chip is minimized, so that total power consumption of the DSL system is minimized.

In a possible implementation, the initial value determining module is further configured to:

if service traffic information of at least one subscriber line and/or transmission capability information of at least one subscriber line change/changes, determine, according to changed service traffic information of each subscriber line and changed transmission capability information of each subscriber line, a transmission opportunity initial value reallocated to each subscriber line in the TDD frame;

the transmission solution determining module is further configured to:

determine a group transmission solution after first adjustment according to the transmission opportunity initial value reallocated to each subscriber line and determined by the initial value determining module; and the transmission solution determining module is configured to:

adjust the transmission opportunity occupied by each subscriber line in the normal operation interval, to obtain a transmission opportunity occupied by each subscriber line in the normal operation interval after the first adjustment, and adjust the transmission opportunity occupied by each subscriber line group in the discontinuous operation interval, to obtain a transmission opportunity occupied by each subscriber line group in the discontinuous operation interval after the first adjustment.

In this embodiment, the group transmission solution is dynamically adjusted according to a variation of the service traffic information and/or a variation of the transmission capability information of the subscriber line, so that the group transmission solution can adapt to the variation of the subscriber line.

In a possible implementation, the transmission solution determining module is configured to:

keep each subscriber line group unchanged, adjust the transmission opportunity occupied by each subscriber line in the normal operation interval, to obtain the transmission opportunity occupied by each subscriber line in the normal operation interval after the first adjustment, and adjust the transmission opportunity occupied by each subscriber line group in the discontinuous operation interval, to obtain the transmission opportunity occupied by each subscriber line group in the discontinuous operation interval after the first adjustment, where the following conditions are met: a quantity of idle symbols that need to be filled in the TDD frame after the first adjustment is smallest; power consumption of the vectoring processor VP chip in the TDD frame after the first adjustment is smallest, and power consumption of the VP chip in the TDD frame at a single symbol location is directly proportional to a square of a quantity of subscriber lines that need to participate in transmission at the symbol location; for each subscriber line, a difference between a quantity of transmission opportunities allocated to the subscriber line after the first adjustment and a transmission opportunity initial value reallocated to the subscriber line falls within the preset range; and each subscriber line group performs time-sharing sending, and a combination of all the subscriber line groups after the first adjustment occupies all symbol locations in the discontinuous operation interval.

In this embodiment, the subscriber line group is kept unchanged during the first adjustment, so that the subscriber line group may be prevented from being frequently adjusted, calculation amount is reduced, and energy consumption is further reduced.

In a possible implementation, that a quantity of idle symbols that need to be filled in the TDD frame is smallest is specifically:

calculating a product of a transmission opportunity occupied by any subscriber line in the normal operation interval and a quantity of subscriber lines in the normal operation interval, to obtain a first result;

for each subscriber line group in the discontinuous operation interval, calculating a product of a transmission opportunity occupied by the subscriber line group in the discontinuous operation interval and a quantity of subscriber lines included in the subscriber line group, to obtain a second result; and calculating a sum of the second results corresponding to all the subscriber line groups to obtain a third result, and calculating a sum of the first result and the third result to obtain a fourth result, so that a difference between the fourth result and a total quantity of transmission opportunities allocated to all the subscriber lines is smallest, and the quantity of transmission opportunities allocated to the subscriber line is determined according to the transmission opportunity initial value allocated to the subscriber line.

In a possible implementation, that power consumption of a VP chip in the TDD frame is smallest is specifically:

calculating a product of a square of a total quantity of subscriber lines in the DSL system and a quantity of transmission opportunities occupied by any subscriber line in the normal operation interval, to obtain a fifth result;

for each subscriber line group in the discontinuous operation interval, calculating a product of a square of a quantity of subscriber lines included in the subscriber line group and a quantity of transmission opportunities occupied by the subscriber line group in the discontinuous operation interval, to obtain a sixth result; and calculating a sum of the sixth results corresponding to all the subscriber line groups to obtain a seventh result, so that a sum of the seventh result and the fifth result is smallest.

In a possible implementation, the transmission solution determining module is further configured to:

after determining the group transmission solution after the first adjustment according to the transmission opportunity initial value reallocated to each subscriber line, if a DSL system performance indicator corresponding to the group transmission solution after the first adjustment is better than a preset performance indicator, accepting the group transmission solution after the first adjustment.

In a possible implementation, the transmission solution determining module is further configured to:

after determining the group transmission solution after the first adjustment according to the transmission opportunity initial value reallocated to each subscriber line, determine whether a current time is in a time window in which the subscriber line group is prohibited from being adjusted; and if the current time is not in the time window, determine a group transmission solution after second adjustment according to the transmission opportunity initial value reallocated to each subscriber line; or if the current time is in the time window, accept the group transmission solution after the first adjustment; and the determining a group transmission solution after second adjustment includes:

adjusting the transmission opportunity occupied by each subscriber line in the normal operation interval, to obtain a transmission opportunity occupied by each subscriber line in the normal operation interval after the second adjustment, adjusting the subscriber line group in the discontinuous operation interval, to obtain a subscriber line group in the discontinuous operation interval after the second adjustment, and adjusting the transmission opportunity occupied by each subscriber line group in the discontinuous operation interval, to obtain a transmission opportunity occupied by each subscriber line group in the discontinuous operation interval after the second adjustment.

In this embodiment, the time window in which the subscriber line group is prohibited from being adjusted is set, so that the subscriber line group is prevented from being frequently adjusted, and an objective of energy saving is further achieved.

In a possible implementation, the transmission solution determining module is further configured to:

after determining the group transmission solution after the first adjustment according to the transmission opportunity initial value reallocated to each subscriber line, before determining whether the current time is in the time window in which the subscriber line group is prohibited from being adjusted, determine that a DSL system performance indicator corresponding to the group transmission solution after the first adjustment is not better than a preset performance indicator.

In a possible implementation, the transmission solution determining module is further configured to:

after determining the group transmission solution after the second adjustment, determine a better value from a DSL system performance indicator corresponding to the group transmission solution after the first adjustment and a DSL system performance indicator corresponding to the group transmission solution after the second adjustment, and accept a group transmission solution corresponding to the better value.

According to a third aspect, an embodiment of the present invention further provides a network-side device, where the network-side device mainly includes a processor and a memory, the memory stores a preset program, and the processor reads the program stored in the memory, and executes the following process according to the program:

determining, according to service traffic information of each subscriber line and transmission capability information of each subscriber line, a transmission opportunity initial value allocated to each subscriber line in a time division duplex TDD frame; and determining a group transmission solution according to the transmission opportunity initial value of each subscriber line; and the processor is configured to: divide the TDD frame into a normal operation interval and a discontinuous operation interval, determine a transmission opportunity occupied by each subscriber line in the normal operation interval, and determine a subscriber line group in the discontinuous operation interval and a transmission opportunity occupied by each subscriber line group in the discontinuous operation interval, where each subscriber line meets a condition that a difference between a quantity of transmission opportunities allocated to the subscriber line and a transmission opportunity initial value allocated to the subscriber line falls within a preset range.

In this embodiment, the group transmission solution is dynamically determined by using the transmission opportunity initial value preallocated to the subscriber line as a constraint, conventional DSL resource scheduling in which only a physical layer parameter and an indicator are considered changes, and the upper-layer service traffic information and the transmission capability information are jointly considered, so that overall performance of the DSL system can be improved. In addition, the present invention can adjust the group transmission solution in real time according to a variation of the service traffic information, so that a quantity of sent symbols is directly proportional to data traffic, system energy efficiency is improved, and energy consumption of the DSL system is reduced.

In a possible implementation, the service traffic information includes at least one of or a combination of a cache queue depth, a service data arrival rate, or an amount of cached service data; and the transmission capability information includes at least a line rate.

In a possible implementation, the processor is configured to: for any subscriber line, determine a ratio of a service data arrival rate of the subscriber line to a line rate as a first ratio, determine a ratio of an amount of cached service data of the subscriber line to a cache queue depth as a second ratio, determine a first coefficient according to the first ratio and the second ratio, calculate a product of the obtained first coefficient and a total quantity of symbols included in the TDD frame, and determine, according to the product, a transmission opportunity initial value allocated to the subscriber line.

In this embodiment, the determined transmission opportunity initial value of the subscriber line can adapt to a variation of a rate ratio and a variation of a cache ratio, and the transmission opportunity initial value of the subscriber line can be determined according to a requirement of the subscriber line.

In a possible implementation, the processor is configured to: determine that the transmission opportunity initial value allocated to the subscriber line is not less than the product, and meets a system parameter constraint condition, where the system parameter constraint condition includes at least a minimum quantity of transmission opportunities.

In this embodiment, the determined transmission opportunity initial value of the subscriber line can meet a basic requirement of the system.

In a possible implementation, the transmission capability information further includes a transmission correctness percentage; and the transmission opportunity initial value allocated to the subscriber line further includes a transmission opportunity required for data retransmission and determined according to the transmission correctness percentage.

In this embodiment, when the transmission opportunity initial value is determined, the transmission correctness percentage of the subscriber line is considered, so that data incorrectly transmitted can be retransmitted by using the transmission opportunity of the subscriber line.

In a possible implementation, the processor is configured to:

determine the transmission opportunity occupied by each subscriber line in the normal operation interval, and determine each subscriber line group in the discontinuous operation interval and the transmission opportunity occupied by each subscriber line group in the discontinuous operation interval, where the following conditions are met: a quantity of idle symbols that need to be filled in the TDD frame is smallest; power consumption of a vectoring processor VP chip in the TDD frame is smallest, and power consumption of the VP chip in the TDD frame at a single symbol location is directly proportional to a square of a quantity of subscriber lines that need to participate in transmission at the symbol location; and each subscriber line group performs time-sharing sending, and a combination of all the subscriber line groups occupies all symbol locations in the discontinuous operation interval.

In this embodiment, the idle symbols filled in the TDD frame are minimized, and the power consumption of the VP chip is minimized, so that total power consumption of the DSL system is minimized.

In a possible implementation, the processor is further configured to:

if service traffic information of at least one subscriber line and/or transmission capability information of at least one subscriber line change/changes, determine, according to changed service traffic information of each subscriber line and changed transmission capability information of each subscriber line, a transmission opportunity initial value reallocated to each subscriber line in the TDD frame; and determine a group transmission solution after first adjustment according to the transmission opportunity initial value reallocated to each subscriber line; and the determining, by the processor, a group transmission solution after first adjustment includes: adjusting the transmission opportunity occupied by each subscriber line in the normal operation interval, to obtain a transmission opportunity occupied by each subscriber line in the normal operation interval after the first adjustment, and adjusting the transmission opportunity occupied by each subscriber line group in the discontinuous operation interval, to obtain a transmission opportunity occupied by each subscriber line group in the discontinuous operation interval after the first adjustment.

In this embodiment, the group transmission solution is dynamically adjusted according to a variation of the service traffic information and/or a variation of the transmission capability information of the subscriber line, so that the group transmission solution can adapt to the variation of the subscriber line.

In a possible implementation, the determining, by the processor, a group transmission solution after first adjustment includes:

keeping each subscriber line group unchanged, adjusting the transmission opportunity occupied by each subscriber line in the normal operation interval, to obtain the transmission opportunity occupied by each subscriber line in the normal operation interval after the first adjustment, and adjusting the transmission opportunity occupied by each subscriber line group in the discontinuous operation interval, to obtain the transmission opportunity occupied by each subscriber line group in the discontinuous operation interval after the first adjustment, where the following conditions are met: a quantity of idle symbols that need to be filled in the TDD frame after the first adjustment is smallest: power consumption of the vectoring processor VP chip in the TDD frame after the first adjustment is smallest, and power consumption of the VP chip in the TDD frame at a single symbol location is directly proportional to a square of a quantity of subscriber lines that need to participate in transmission at the symbol location; for each subscriber line, a difference between a quantity of transmission opportunities allocated to the subscriber line after the first adjustment and a transmission opportunity initial value reallocated to the subscriber line falls within the preset range; and each subscriber line group performs time-sharing sending, and a combination of all the subscriber line groups after the first adjustment occupies all symbol locations in the discontinuous operation interval.

In this embodiment, the subscriber line group is kept unchanged during the first adjustment, so that the subscriber line group may be prevented from being frequently adjusted, calculation amount is reduced, and energy consumption is further reduced.

In a possible implementation, that a quantity of idle symbols that need to be filled in the TDD frame is smallest is specifically:

calculating a product of a transmission opportunity occupied by any subscriber line in the normal operation interval and a quantity of subscriber lines in the normal operation interval, to obtain a first result;

for each subscriber line group in the discontinuous operation interval, calculating a product of a transmission opportunity occupied by the subscriber line group in the discontinuous operation interval and a quantity of subscriber lines included in the subscriber line group, to obtain a second result; and calculating a sum of the second results corresponding to all the subscriber line groups to obtain a third result, and calculating a sum of the first result and the third result to obtain a fourth result, so that a difference between the fourth result and a total quantity of transmission opportunities allocated to all the subscriber lines is smallest, and the quantity of transmission opportunities allocated to the subscriber line is determined according to the transmission opportunity initial value allocated to the subscriber line.

In a possible implementation, that power consumption of a VP chip in the TDD frame is smallest is specifically:

calculating a product of a square of a total quantity of subscriber lines in the DSL system and a quantity of transmission opportunities occupied by any subscriber line in the normal operation interval, to obtain a fifth result;

for each subscriber line group in the discontinuous operation interval, calculating a product of a square of a quantity of subscriber lines included in the subscriber line group and a quantity of transmission opportunities occupied by the subscriber line group in the discontinuous operation interval, to obtain a sixth result; and calculating a sum of the sixth results corresponding to all the subscriber line groups to obtain a seventh result, so that a sum of the seventh result and the fifth result is smallest.

In a possible implementation, the processor is further configured to:

after determining the group transmission solution after the first adjustment according to the transmission opportunity initial value reallocated to each subscriber line, if a DSL system performance indicator corresponding to the group transmission solution after the first adjustment is better than a preset performance indicator, accept the group transmission solution after the first adjustment.

In a possible implementation, the processor is configured to: after determining the group transmission solution after the first adjustment according to the transmission opportunity initial value reallocated to each subscriber line, determine whether a current time is in a time window in which the subscriber line group is prohibited from being adjusted; and if the current time is not in the time window, determine a group transmission solution after second adjustment according to the transmission opportunity initial value reallocated to each subscriber line; or if the current time is in the time window, accept the group transmission solution after the first adjustment; and the determining a group transmission solution after second adjustment includes:

adjusting the transmission opportunity occupied by each subscriber line in the normal operation interval, to obtain a transmission opportunity occupied by each subscriber line in the normal operation interval after the second adjustment, adjusting the subscriber line group in the discontinuous operation interval, to obtain a subscriber line group in the discontinuous operation interval after the second adjustment, and adjusting the transmission opportunity occupied by each subscriber line group in the discontinuous operation interval, to obtain a transmission opportunity occupied by each subscriber line group in the discontinuous operation interval after the second adjustment.

In this embodiment, the time window in which the subscriber line group is prohibited from being adjusted is set, so that the subscriber line group is prevented from being frequently adjusted, and an objective of energy saving is further achieved.

In a possible implementation, the process is further configured to:

after determining the group transmission solution after the first adjustment according to the transmission opportunity initial value reallocated to each subscriber line, before determining whether the current time is in the time window in which the subscriber line group is prohibited from being adjusted, determine that a DSL system performance indicator corresponding to the group transmission solution after the first adjustment is not better than a preset performance indicator.

In a possible implementation, the process is further configured to:

after determining the group transmission solution after the second adjustment, determine a better value from a DSL system performance indicator corresponding to the group transmission solution after the first adjustment and a DSL system performance indicator corresponding to the group transmission solution after the second adjustment, and accept a group transmission solution corresponding to the better value.

According to a fourth aspect, an embodiment of the present invention further provides a digital subscriber line DSL system, including a network-side device and at least two subscriber lines, where the network-side device includes the apparatus according to any one of the foregoing aspects.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Power consumption of a Gfast system mainly comes from a vectoring processor (VP) chip, and includes power consumption for coefficient matrix calculation, power consumption for a multiplication operation of a coefficient matrix and a data symbol, and the like. The VP chip is a generic name for a backward canceller and a precoder.

There is an exponential relationship between power consumption of the VP chip and a quantity of subscriber lines in a vectoring group. Therefore, when the quantity of subscriber lines is relatively large, for example, 48 or 96 lines, the power consumption of the VP chip sharply increases. In addition, the Gfast system uses natural heat dissipation and reverse power supply, and energy consumption needs to be highly limited. Therefore, energy saving becomes an important problem that needs to be resolved by the Gfast system. In the embodiments of the present invention, downstream transmission is used as an example for specific description. It should be noted that, the embodiments of the present invention may be applied to upstream transmission and downstream transmission, and the upstream transmission can be implemented provided that corresponding concepts in a downstream transmission processing process are equivalently replaced.

To save energy, a G.9701 standard defines a discontinuous operation (DO) mode, that is, when no service data is transmitted on a subscriber line, a transceiver may be disabled at some symbol locations (in transmission timeslots), so that power consumption is reduced.

Figure 1:
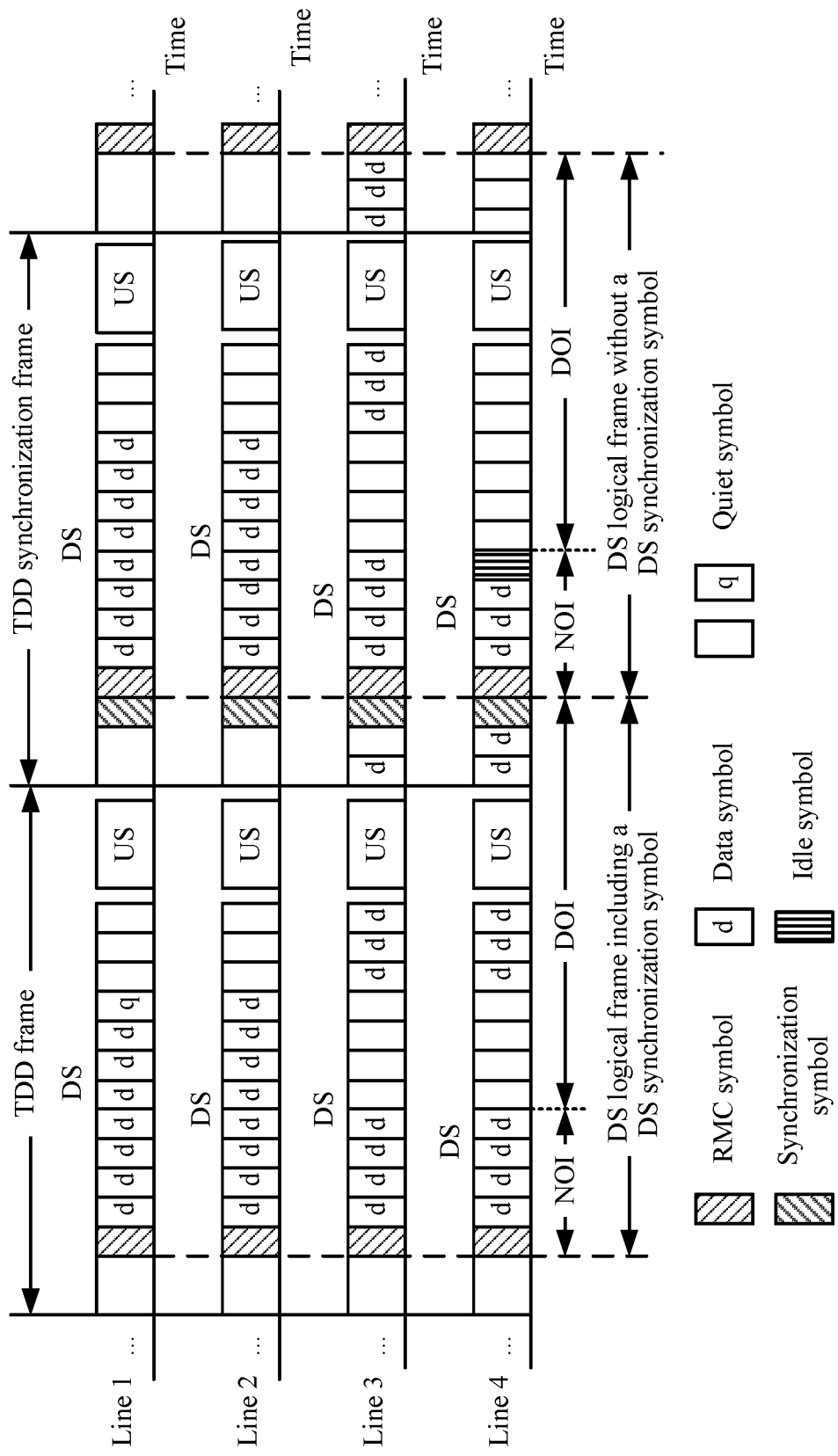
FIG. 1 is a schematic diagram of a DO mode in G9701.

Specifically, as shown in FIG. 1, in the G.9701 standard, a downstream logical frame (DS logical frame) is divided into a normal operation interval NOI) and a discontinuous operation interval (DOI). As defined, the downstream logical frame includes symbols starting from a downstream robust management channel (RMC) symbol and ending before a next downstream RMC symbol.

In the NOI, all subscriber lines in the vectoring group may send a symbol, and if there is no service data, still need to send an idle symbol. In the DOI, some subscriber lines that still need to send service data perform sending by occupying a symbol location according to a requirement. Each line may perform time-sharing sending, or the lines may be divided into several small vectoring groups, and each group performs time-sharing sending, or the like.

The G.9701 standard defines a parameter configured for a subscriber line that occupies a symbol location in a logical frame, that is, a transmission opportunity (TXOP), mainly including the following parameters:

Tbudget, a total quantity of symbols that can be used for sending data;

TTR, a quantity of symbols in the NOI;

TA, a quantity of quiet symbols that need to be sent after the DOI starts; and the like.

To implement the DO mode, that is, to configure TXOP parameters for each subscriber line in the vectoring group to reduce power consumption to a greatest extent when a data transmission requirement is met, a dynamic resource allocation (DRA) function is required.

Figure 2:
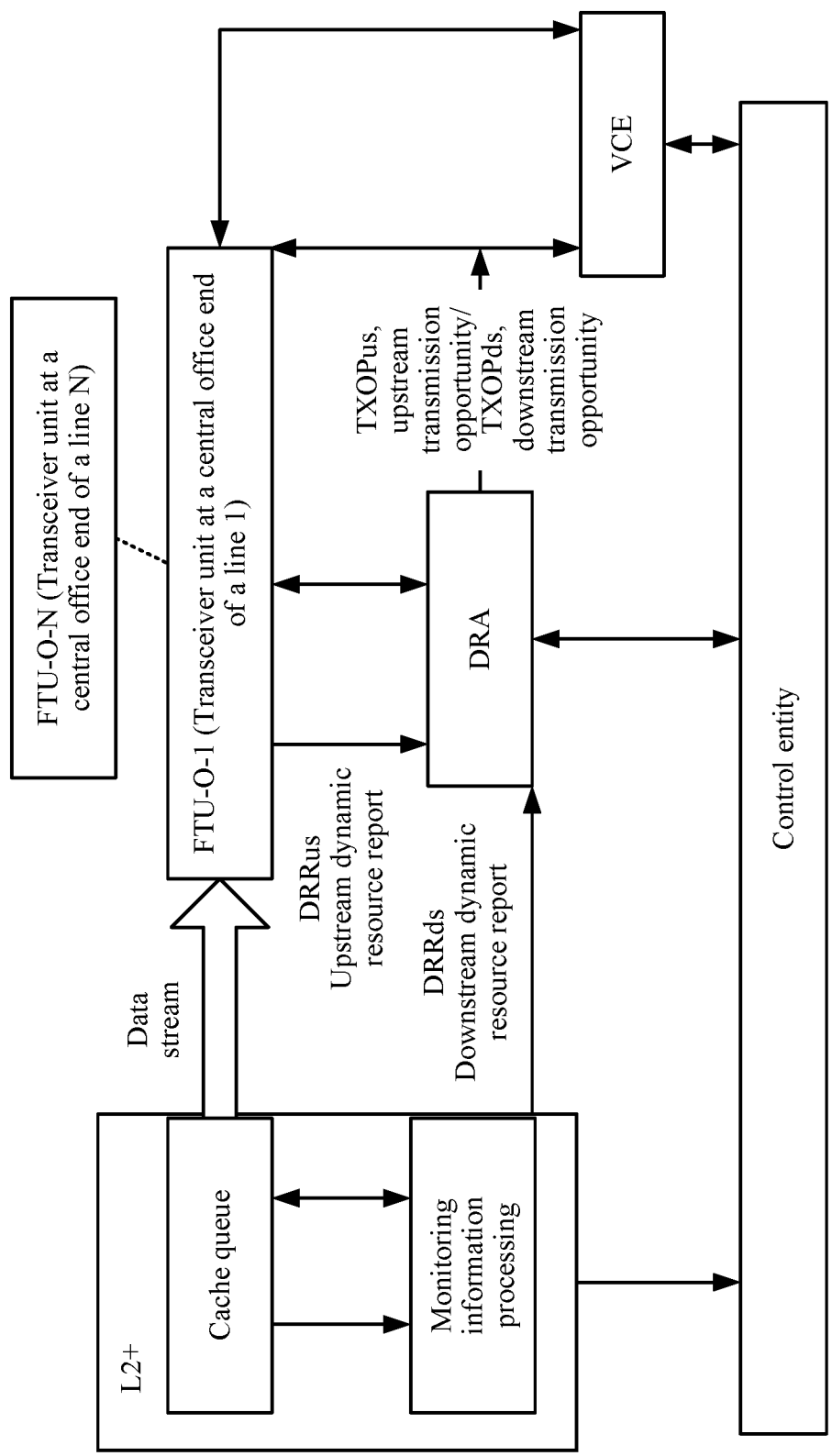
FIG. 2 is a schematic diagram of a DPU reference module.

FIG. 2 is a schematic diagram of a distribution point unit (DPU) reference module. A DRA module that is configured to implement a DRA function may control allocation of transmission opportunities (TXOPds-1 and TXOPus-1) based on input parameters (DRRds-1 and DRRus-1). Information is transferred between the DRA module and an associated module by using an interactive mechanism, for example, transferring of an upstream dynamic resource report (DRRus-1) and interaction of control parameters.

However, currently, a specific implementation solution of how the DRA module performs transmission opportunity scheduling is not given.

In view of this, in the embodiments of the present invention, a Gfast system is used as an example, and a resource scheduling method in a DSL system is provided in an existing protocol framework, to implement resource scheduling for a TDD frame, and achieve an objective of reducing energy consumption of the DSL system. It should be noted that the resource scheduling method provided in the embodiments of the present invention may be applied to any TDD system, and is not limited to the Gfast system.

In the following embodiments, a transmission opportunity includes a transmission timeslot or transmission duration. The transmission timeslot or the transmission duration uses one symbol period as a granularity. The transmission opportunity also uses one symbol period as a granularity, that is, one symbol period is one transmission opportunity.

Figure 3:
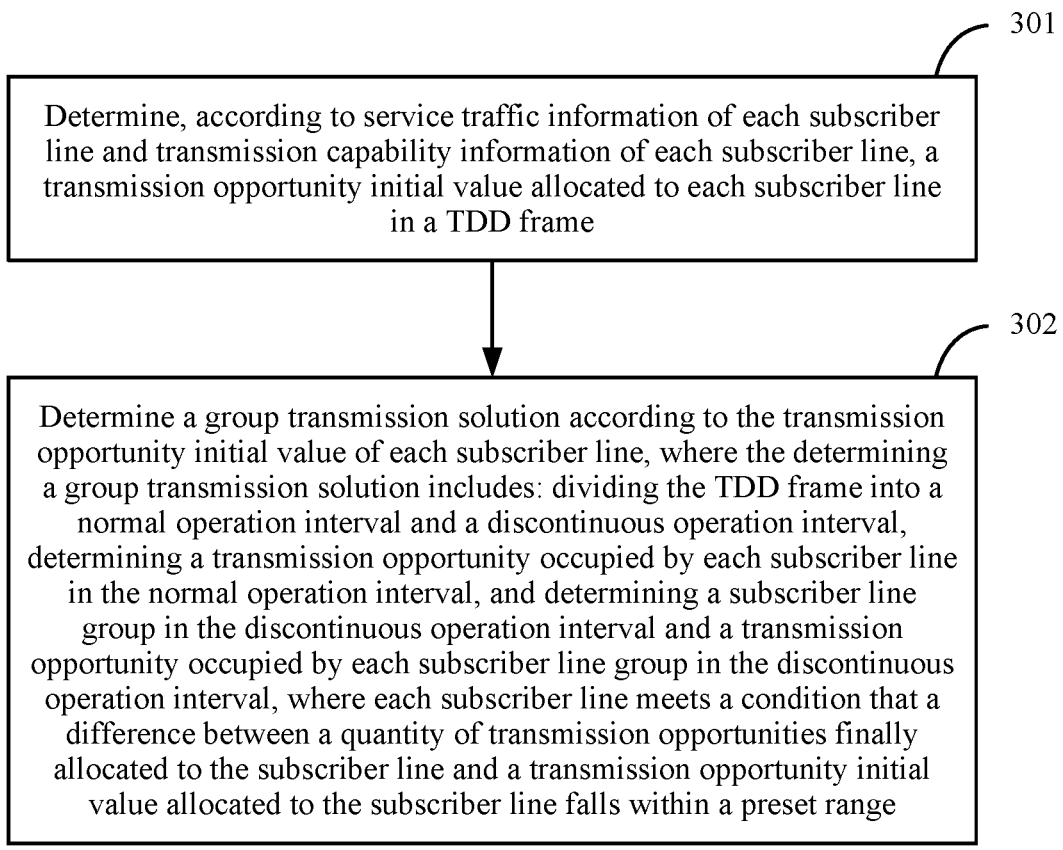
FIG. 3 is a schematic flowchart of a resource scheduling method in a DSL system according to an embodiment of the present invention.

FIG. 3 is a schematic flowchart of a detailed resource scheduling method in a DSL system. In the example shown in FIG. 3, the DSL system includes a network-side device and at least two subscriber lines, and a specific resource scheduling processing is described as follows:

Step 301: Determine, according to service traffic information of each subscriber line and transmission capability information of each subscriber line, a transmission opportunity initial value allocated to each subscriber line in a TDD frame.

In implementation, the service traffic information of the subscriber line includes at least one of or a combination of a cache queue depth, a service data arrival rate, or an amount of cached service data; and the transmission capability information of the subscriber line includes at least a line rate.

Specifically, for any subscriber line, a ratio of a service data arrival rate of the subscriber line to a line rate is determined as a first ratio, a ratio of an amount of cached service data of the subscriber line to a cache queue depth is determined as a second ratio, a first coefficient is determined according to the first ratio and the second ratio, a product of the obtained first coefficient and a total quantity of symbols included in the TDD frame is calculated, and a transmission opportunity initial value allocated to the subscriber line is determined according to the product.

when the transmission opportunity initial value allocated to the subscriber line is determined according to the product, the following conditions need to be met: The transmission opportunity initial value allocated to the subscriber line is not less than the product, and meets a system parameter constraint condition. The system parameter constraint condition includes at least a minimum quantity of transmission opportunities.

Preferably, that the first coefficient is determined according to the first ratio and the second ratio is specifically: calculating a sum of a product that is obtained by multiplying the first ratio and a first weight coefficient and a product that is obtained by multiplying the second ratio and a second weight coefficient, and using the obtained sum as the first coefficient. In this manner, the first weight coefficient and the second weight coefficient are adjusted, so that the preallocated transmission opportunity initial value can preferably adapt to a variation of a rate ratio or preferably adapt to a variation of a cache ratio.

In some embodiments, the transmission capability information of the subscriber line further includes a transmission correctness percentage.

In some embodiments, the transmission opportunity initial value allocated to the subscriber line further includes a transmission opportunity required for data retransmission and determined according to the transmission correctness percentage of the subscriber line. When the transmission opportunity initial value is preallocated, the transmission correctness percentage of the subscriber line is considered, so that data incorrectly transmitted can be retransmitted by using the transmission opportunity preallocated to the subscriber line.

For example, one transmission opportunity occupies one symbol, it is determined, according to a calculation method provided in step 301, that a transmission opportunity initial value that meets a requirement of a first subscriber line occupies five symbols, that is, five transmission opportunities, and it is determined, according to the calculation method provided in step 301, that a transmission opportunity initial value that meets a requirement of a second subscriber line occupies six symbols, that is, six transmission opportunities.

Step 302: Determine a group transmission solution according to the transmission opportunity initial value of each subscriber line, where the determining a group transmission solution includes: dividing the TDD frame into a normal operation interval and a discontinuous operation interval, determining a transmission opportunity occupied by each subscriber line in the normal operation interval, and determining a subscriber line group in the discontinuous operation interval and a transmission opportunity occupied by each subscriber line group in the discontinuous operation interval, where each subscriber line meets a condition that a difference between a quantity of transmission opportunities allocated to the subscriber line and a transmission opportunity initial value allocated to the subscriber line falls within a preset range.

In this embodiment of the present invention, the group transmission solution is designed by using minimizing total power consumption of the DSL system as an optimization objective, and may specifically include minimizing idle symbols that need to be filled in the TDD frame in the DSL system and minimizing power consumption of a VP chip. To achieve the objective, two aspects may be considered. Based on a transmission opportunity initial value preallocated to a subscriber line, upper bound constraint and lower bound constraint are performed on a quantity of transmission opportunities allocated to the subscriber line, to ensure that a difference between the quantity of transmission opportunities that are allocated and the preallocated transmission opportunity initial value is not extremely large. In addition, all subscriber line groups perform time-sharing sending, and occupy all symbols in the TDD frame, to effectively reduce a quantity of subscriber lines included in a single subscriber line group, thereby effectively reducing the power consumption of the VP chip.

Preferably, when the group transmission solution is determined according to the transmission opportunity initial value allocated to each subscriber line, the following conditions need to be met:

determining the transmission opportunity occupied by each subscriber line in the normal operation interval, and determining each subscriber line group in the discontinuous operation interval and the transmission opportunity occupied by each subscriber line group in the discontinuous operation interval, where the following conditions are met: a quantity of idle symbols that need to be filled in the TDD frame is smallest; power consumption of a VP chip in the TDD frame is smallest, and power consumption of the VP chip in the TDD frame at a single symbol location is directly proportional to a square of a quantity of subscriber lines that need to participate in transmission at the symbol location, and for each subscriber line; the difference between the quantity of transmission opportunities allocated to the subscriber line and the transmission opportunity initial value allocated to the subscriber line falls within the preset range; and each subscriber line group performs time-sharing sending, and a combination of all the subscriber line groups occupies all symbol locations in the discontinuous operation interval.

Preferably, that a quantity of idle symbols that need to be filled in the TDD frame is smallest is specifically: calculating a product of a transmission opportunity occupied by any subscriber line in the normal operation interval and a quantity of subscriber lines in the normal operation interval, to obtain a first result; for each subscriber line group in the discontinuous operation interval, calculating a product of a transmission opportunity occupied by the subscriber line group in the discontinuous operation interval and a quantity of subscriber lines included in the subscriber line group, to obtain a second result; and calculating a sum of the second results corresponding to all the subscriber line groups to obtain a third result, and calculating a sum of the first result and the third result to obtain a fourth result, so that a difference between the fourth result and a total quantity of transmission opportunities allocated to all the subscriber lines is smallest.

Preferably, that power consumption of a VP chip in the TDD frame is smallest is specifically: calculating a product of a square of a total quantity of subscriber lines in the DSL system and a quantity of transmission opportunities occupied by any subscriber line in the normal operation interval, to obtain a fifth result; for each subscriber line group in the discontinuous operation interval, calculating a product of a square of a quantity of subscriber lines included in the subscriber line group and a quantity of transmission opportunities occupied by the subscriber line group in the discontinuous operation interval, to obtain a sixth result; and calculating a sum of the sixth results corresponding to all the subscriber line groups to obtain a seventh result, so that a sum of the seventh result and the fifth result is smallest.

Figure 4:
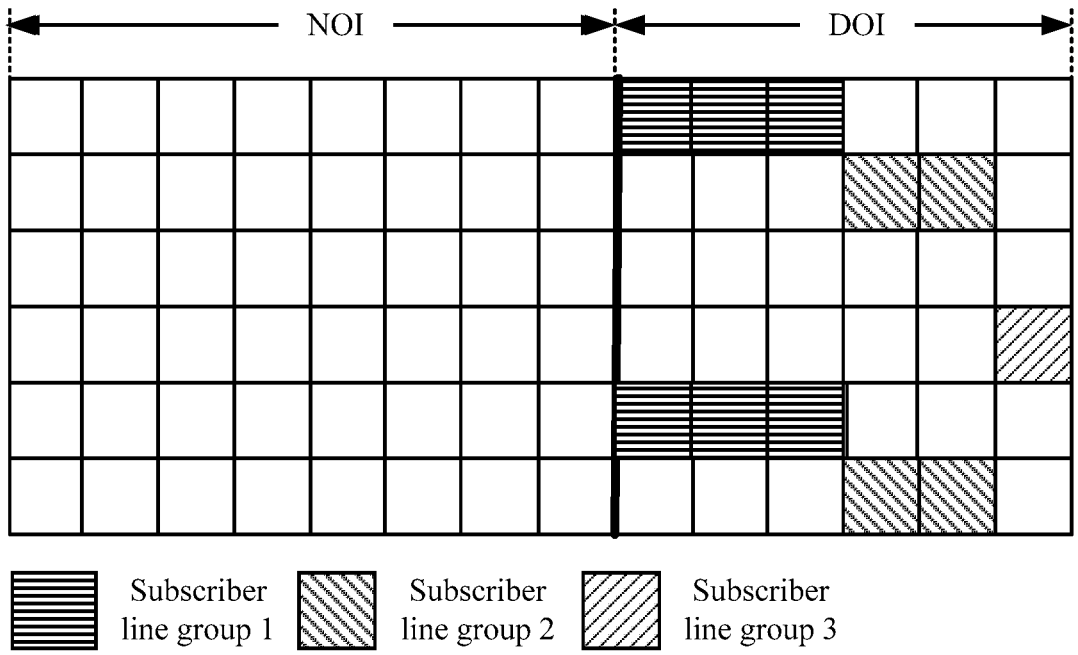
FIG. 4 is a schematic diagram of a group transmission solution according to an embodiment of the present invention.

In the group transmission solution, the transmission opportunity occupied by each subscriber line in the NOI is determined, and each subscriber line group in the DOI and the transmission opportunity occupied by each subscriber line group in the DOI are also determined. As shown in FIG. 4, FIG. 4 is a schematic diagram of a group transmission solution. A Gfast system is used as an example. After the group transmission solution is accepted, the transmission opportunities of each subscriber line in the normal operation interval and in the discontinuous operation interval are configured for a corresponding subscriber line, so that the subscriber line performs data transmission according to the configured transmission opportunity, so that a DO mode is implemented, and an objective of energy saving is achieved.

In implementation, a status of service data traffic in the DSL system may change, and a line rate of the subscriber line may also be adjusted. Therefore, the existing group transmission solution may be inapplicable, and the group transmission solution needs to be adjusted according to the changed information. Adjusting the group transmission solution includes adjusting the transmission opportunity occupied in the normal operation interval, and/or adjusting the subscriber line group, and/or adjusting the transmission opportunity occupied by each subscriber line group.

Adjustment of the subscriber line group relates to recalculation of a VP chip cancellation coefficient. Therefore, in consideration of a limitation of software and hardware, the subscriber line group should be prevented from being frequently adjusted. Therefore, in this embodiment of the present invention, when the group transmission solution needs to be adjusted, and it is preferably ensured that the subscriber line group does not change, only the transmission opportunity occupied in the normal operation interval and the transmission opportunity occupied by each subscriber line group are adjusted, that is, only timeslot adjustment is performed.

Specifically, if service traffic information of at least one subscriber line and/or transmission capability information of at least one subscriber line change/changes, a transmission opportunity initial value reallocated to each subscriber line in the TDD frame is determined according to changed service traffic information of each subscriber line and changed transmission capability information of each subscriber line; and a group transmission solution after first adjustment is determined according to the transmission opportunity initial value reallocated to each subscriber line.

For determining the transmission opportunity initial value reallocated to each subscriber line in the TDD frame, refer to the description of determining the transmission opportunity initial value of the subscriber line in step 301. Details are not repeatedly described herein.

The first adjustment is timeslot adjustment, the group transmission solution after the first adjustment is a transmission solution after the timeslot adjustment, that is, the subscriber line group is kept unchanged, and only the transmission opportunity occupied in the normal operation interval and the transmission opportunity occupied by each subscriber line group in the discontinuous operation interval are adjusted. The timeslot adjustment is specifically: adjusting the transmission opportunity occupied by each subscriber line in the normal operation interval, to obtain a transmission opportunity occupied by each subscriber line in the normal operation interval after the first adjustment, and adjusting the transmission opportunity occupied by each subscriber line group in the discontinuous operation interval, to obtain a transmission opportunity occupied by each subscriber line group in the discontinuous operation interval after the first adjustment.

Similarly, an objective of the timeslot adjustment is an optimization objective for minimizing total power consumption of the DSL system, and specifically includes an optimization objective for minimizing idle symbols that need to be filled in the DSL system, and minimizing power consumption of the VP chip. Preferably, when the group transmission solution after the first adjustment is determined, the following conditions need to be met:

keeping each subscriber line group unchanged, adjusting the transmission opportunity occupied by each subscriber line in the normal operation interval, to obtain the transmission opportunity occupied by each subscriber line in the normal operation interval after the first adjustment, and adjusting the transmission opportunity occupied by each subscriber line group in the discontinuous operation interval, to obtain the transmission opportunity occupied by each subscriber line group in the discontinuous operation interval after the first adjustment, where the following conditions are met: a quantity of idle symbols that need to be filled in the TDD frame after the first adjustment is smallest; power consumption of the VP chip in the TDD frame after the first adjustment is smallest, and power consumption of the VP chip in the TDD frame at a single symbol location is directly proportional to a square of a quantity of subscriber lines that need to participate in transmission at the symbol location, and for each subscriber line; a difference between a quantity of transmission opportunities allocated to the subscriber line after the first adjustment and a transmission opportunity initial value reallocated to the subscriber line falls within the preset range; and each subscriber line group performs time-sharing sending, and a combination of all the subscriber line groups after the first adjustment occupies all symbol locations in the discontinuous operation interval.

The quantity of transmission opportunities allocated to the subscriber line is determined according to the transmission opportunity initial value allocated to the subscriber line.

In this embodiment of the present invention, to prevent the subscriber line group from being frequently adjusted, and achieve an objective of energy saving as much as possible, a time window in which the subscriber line group is prohibited from being adjusted is set. If a current time is in the time window, the subscriber line group is not allowed to be adjusted, and only the timeslot adjustment can be performed; or if the current time is outside the time window, the subscriber line group may be adjusted.

Specifically, after the group transmission solution after the first adjustment is determined according to the transmission opportunity initial value reallocated to each subscriber line, there may be two specific processing manners:

In a first processing manner, after the group transmission solution after the first adjustment is determined according to the transmission opportunity initial value reallocated to each subscriber line, it is determined whether a DSL system performance indicator corresponding to the group transmission solution after the first adjustment is better than a preset performance indicator.

If the performance indicator is better than a preset performance indicator, the group transmission solution after the first adjustment is accepted.

If the performance indicator is not better than a preset performance indicator, whether a current time is in a time window in which the subscriber line group is prohibited from being adjusted is determined. If the current time is not in the time window, a group transmission solution after second adjustment is determined according to the transmission opportunity initial value reallocated to each subscriber line; or if the current time is in the time window, the group transmission solution after the first adjustment is accepted.

In a specific example implementation, the preset performance indicator may be a power consumption cost brought by recalculating the cancellation coefficient. It should be noted that, only an example implementation is given herein, and the preset performance indicator may be a statistical value obtained after many times of emulation, or may be an empirical value. The protection scope of the present invention is not limited thereto.

In a second processing manner, after the group transmission solution after the first adjustment is determined according to the transmission opportunity initial value reallocated to each subscriber line, it is determined whether a current time is in a time window in which the subscriber line group is prohibited from being adjusted; and if the current time is not in the time window, a group transmission solution after second adjustment is determined according to the transmission opportunity initial value reallocated to each subscriber line; or if the current time is in the time window, the group transmission solution after the first adjustment is accepted.

In the first and the second processing manners, if the current time is not in the time window in which the subscriber line group is prohibited from being adjusted, the group transmission solution after the second adjustment may be determined by adjusting the subscriber line group, specifically including: adjusting the transmission opportunity occupied by the normal operation interval, to obtain a transmission opportunity occupied by the normal operation interval after the second adjustment, adjusting the subscriber line group in the discontinuous operation interval, to obtain a subscriber line group in the discontinuous operation interval after the second adjustment, and adjusting the transmission opportunity occupied by each subscriber line group in the discontinuous operation interval, to obtain a transmission opportunity occupied by each subscriber line group in the discontinuous operation interval after the second adjustment.

In the second processing manner, after the group transmission solution after the second adjustment is determined, the DSL system performance indicator corresponding to the group transmission solution after the first adjustment is compared with a DSL system performance indicator corresponding to the group transmission solution after the second adjustment; a better value is determined from the DSL system performance indicator corresponding to the group transmission solution after the first adjustment and the DSL system performance indicator corresponding to the group transmission solution after the second adjustment; and a group transmission solution corresponding to the better value is accepted.

In this embodiment of the present invention, after determining and accepting the group transmission solution, a DRA module sends the group transmission solution to an associated module.

Examples are described below by using three specific embodiments.

Figure 5:
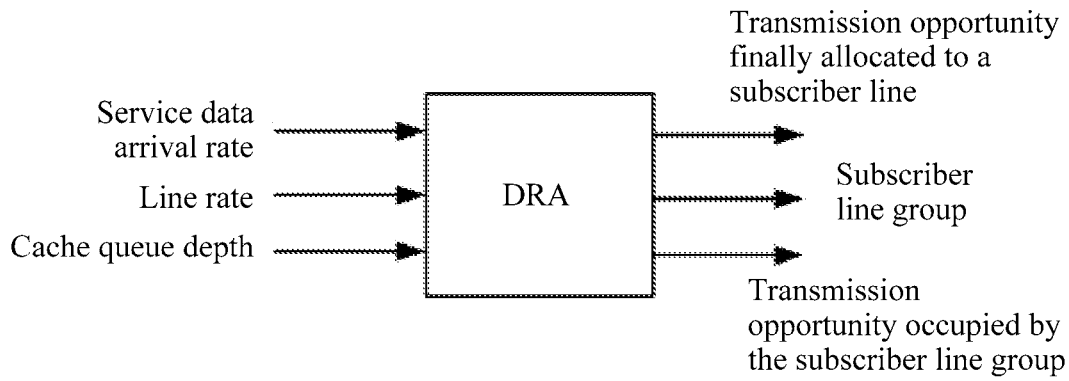
FIG. 5 is a schematic diagram of a functional model for resource scheduling according to an embodiment of the present invention.

A Gfast system is used as an example. A functional model for resource scheduling that is provided by the two specific embodiments is shown in FIG. 5. It is assumed that there are K subscriber lines in the Gfast system, and a DRA module obtains a required parameter from each associated module. For example, the DRA module obtains service traffic information of the K subscriber lines from L2+, and the service traffic information includes a cache queue depth $b_i$, a service data arrival rate $\lambda_i$, and the like. The DRA module obtains transmission capability information of each subscriber line from K Gfast transceiver units (FTU), and the transmission capability information includes a line rate $R_i$, a transmission correctness percentage $P_i$, and the like. The DRA module obtains a system parameter constraint condition from a DPU, and the system parameter constraint condition includes a maximum quantity of downstream symbol locations $M_{ds}$, a minimum number of data symbols (minimum number of data symbols in the NOI, MNDSNOI) that need to be sent in a TDD frame, and the like.

The following embodiments describe a process in which resource scheduling for downstream transmission is performed based on the service traffic information and the transmission capability information for each subscriber line that are obtained by the DRA module.

Figure 6:
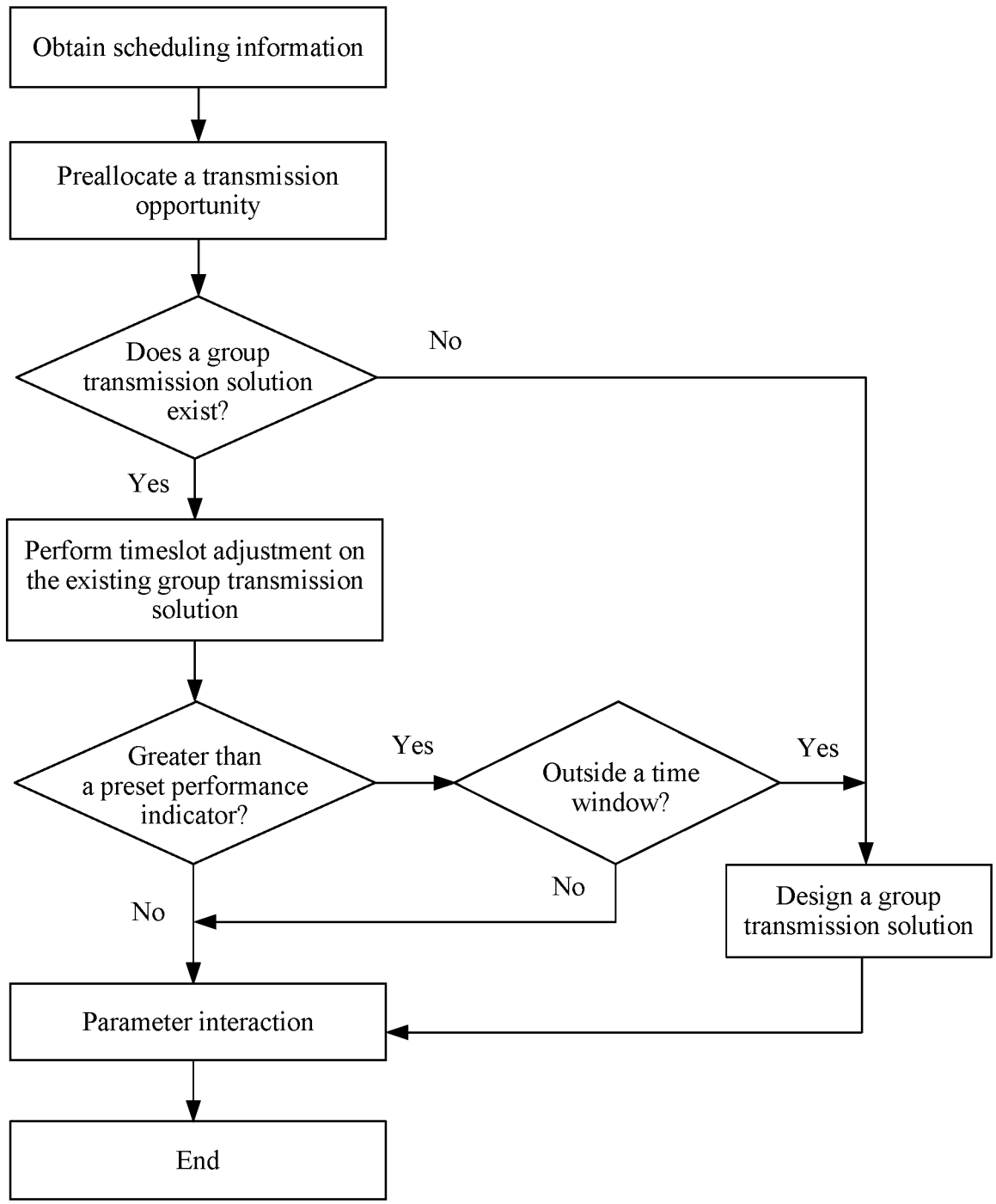
FIG. 6 is a schematic diagram of a resource scheduling process according to a first specific embodiment of the present invention.

In a first specific embodiment, a resource scheduling flowchart is shown in FIG. 6.

Step 1: Obtain Scheduling Information.

Specifically, a DRA module obtains a parameter required for resource scheduling from an associated module, that is, service traffic information and transmission capability information of each subscriber line.

Step 2: Preallocate a Transmission Opportunity.

A transmission opportunity initial value is allocated to each subscriber line. For example, a transmission opportunity initial value allocated to a subscriber line in $M_{ds}$ transmission opportunities is determined according to a first ratio and a second ratio. The first ratio is a ratio of a service data arrival rate $\lambda_i$ of the subscriber line to a line rate $R_i$, and the second ratio is a ratio of an amount of cached service data $b_i$ of the subscriber line to a cache queue depth $B_i$. In some embodiments, a sum of a value obtained by multiplying the first ratio and a first weight coefficient and a value obtained by multiplying the second ratio and a second weight coefficient is calculated, and the obtained sum is multiplied by $M_{ds}$ to obtain the transmission opportunity initial value allocated to the subscriber line, so that the preallocated transmission opportunity initial value can adapt to a variation of a rate ratio or a variation of a cache ratio.

Further, in some embodiments, a transmission correctness percentage of the subscriber line is considered, so that there is an opportunity to use the transmission opportunity initial value that is preallocated to the subscriber line to retransmit data incorrectly transmitted. In addition, the transmission opportunity initial value preallocated to the subscriber line needs to meet an MNDSNOI regulated in the system, that is, a minimum quantity of transmission opportunities regulated in the system.

After the transmission opportunity initial value is allocated to the subscriber line, it is determined whether a group transmission solution exists. If the group transmission solution exists, go to step 3. If the group transmission solution does not exist, go to step 4.

Step 3: Perform Timeslot Adjustment on the Existing Group Transmission Solution.

The subscriber line group in the existing group transmission solution is kept unchanged, only a quantity of transmission opportunities occupied by the subscriber line in a normal operation interval is adjusted, and only a quantity of transmission opportunities occupied by the subscriber line group in a discontinuous operation interval is adjusted. An objective of the timeslot adjustment is an optimization objective for minimizing total power consumption of the DSL system, and specifically includes minimizing idle symbols that need to be filled in the DSL system, and minimizing power consumption consumed by a VP chip by performing a matrix precoding operation.

A power consumption cost that is of the DSL system and that is corresponding to the group transmission solution after the timeslot adjustment is calculated, and the power consumption cost is compared with a preset performance indicator. If the power consumption cost is less than the preset performance indicator, the power consumption cost is better than the preset performance indicator, and the group transmission solution after the timeslot adjustment is accepted. If the power consumption cost is not less than the preset performance indicator, it is further determined whether a current time is outside a time window in which the subscriber line group is prohibited from being adjusted. If the current time is outside the time window, go to step 4; if the current time is not outside the time window, accept the group transmission solution after the timeslot adjustment, and go to step 5.

Step 4: Design a Group Transmission Solution.

The group transmission solution is designed according to the transmission opportunity initial value preallocated to the subscriber line, and includes dividing a TDD frame into an NOI and a DOI, and determining a subscriber line group in the DOI and a transmission opportunity occupied by each subscriber line group. The group transmission solution is designed by using minimizing total power consumption costs of the DSL system as an optimization objective, and specifically includes minimizing idle symbols that need to be filled in the TDD frame in the DSL system, and minimizing the power consumption consumed by the VP chip by performing the matrix precoding operation. The following two aspects may be specifically considered. Based on the preallocated transmission opportunity initial value, upper bound constraint and lower bound constraint are performed on a quantity of transmission opportunities that are allocated, to ensure that a difference between the quantity of transmission opportunities that are allocated and the allocated transmission opportunity initial value is not extremely large. In addition, all subscriber line groups perform time-sharing sending and occupy all downstream symbol locations in the TDD frame, to reduce a quantity of subscriber lines included in a single subscriber line group, thereby effectively reducing the power consumption consumed by the VP chip by performing the matrix precoding operation.

After the designed group transmission solution is accepted, go to step 5.

Step 5: Parameter Interaction.

The accepted group transmission solution is sent to the associated module, for example, sent to a vectoring control entity (VCE), and a Gfast transceiver unit at the side of the operator end of the loop (FTU-O, Gfast transceiver unit at the side of the operator end of the loop).

Figure 7:
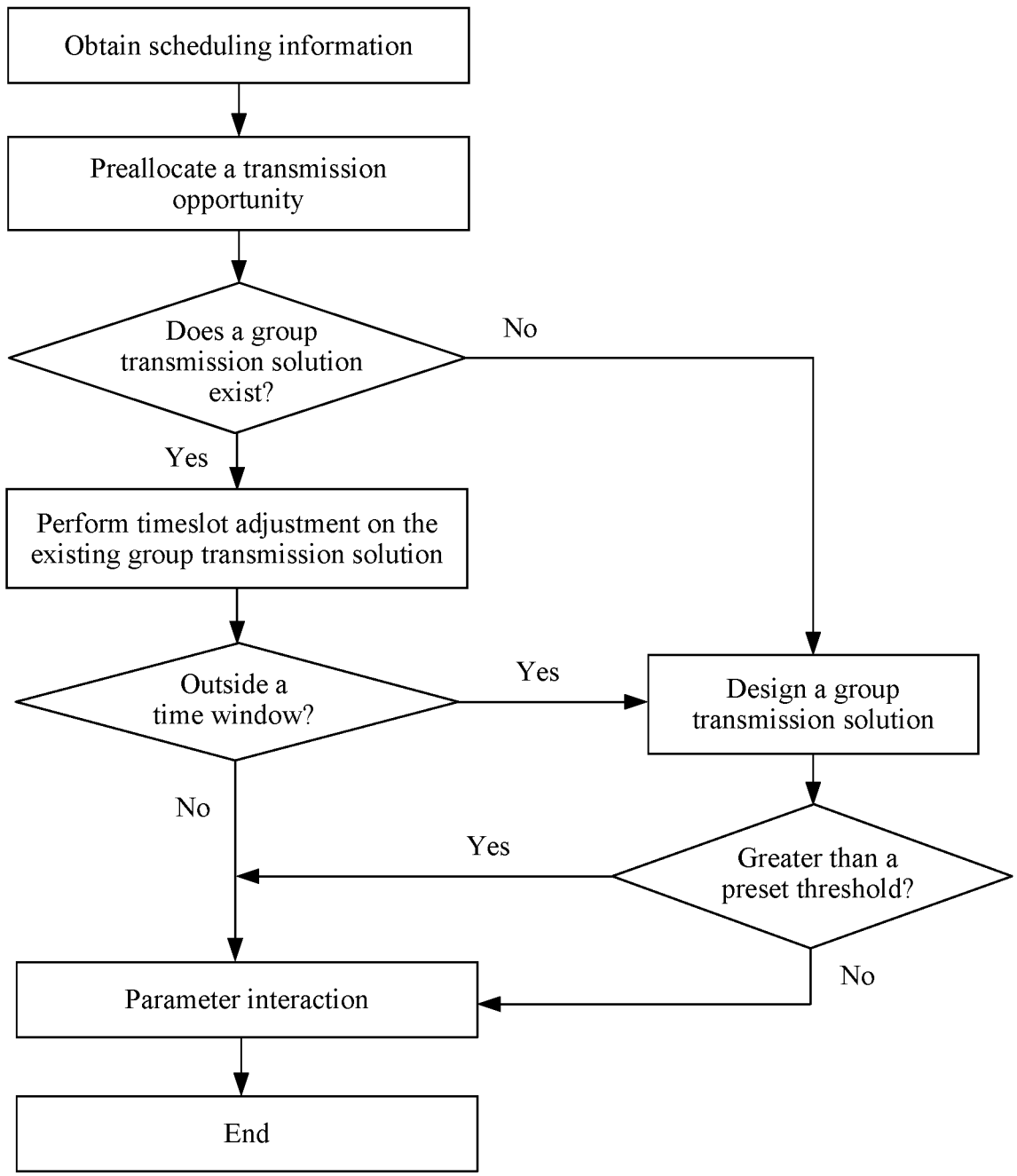
FIG. 7 is a schematic diagram of a resource scheduling process according to a second specific embodiment of the present invention.

In a second specific embodiment, a resource scheduling process is shown in FIG. 7.

Descriptions of step 1 and step 2 are the same as the descriptions of step 1 and step 2 in the first specific embodiment, and details are not repeatedly described herein.

Step 3: Perform Timeslot Adjustment on the Existing Group Transmission Solution.

A difference from step 3 in the first specific embodiment only lies in the following:

After a group transmission solution after the timeslot adjustment is obtained, it is determined whether a current time is outside a time window in which the subscriber line group is prohibited from being adjusted. If the current time is outside the time window, go to step 4; if the current time is not outside the time window accept the group transmission solution after the timeslot adjustment, go to step 5.

Step 4: Design a Group Transmission Solution.

After the group transmission solution is designed in a same manner as that in the first specific embodiment, a difference from step 4 in the first specific embodiment only lies in the following:

When the existing group transmission solution does not exist, the designed group transmission solution is directly accepted.

When the existing group transmission solution exists, a difference between a power consumption cost of the designed group transmission solution in step 4 and a power consumption cost of the existing group transmission solution is calculated. If the difference is greater than or equal to a preset threshold, still use the existing group transmission solution; otherwise, accept the group transmission solution in step 4, and go to step 5.

Step 5 is the same as step 5 in the first specific embodiment.

Figure 8:
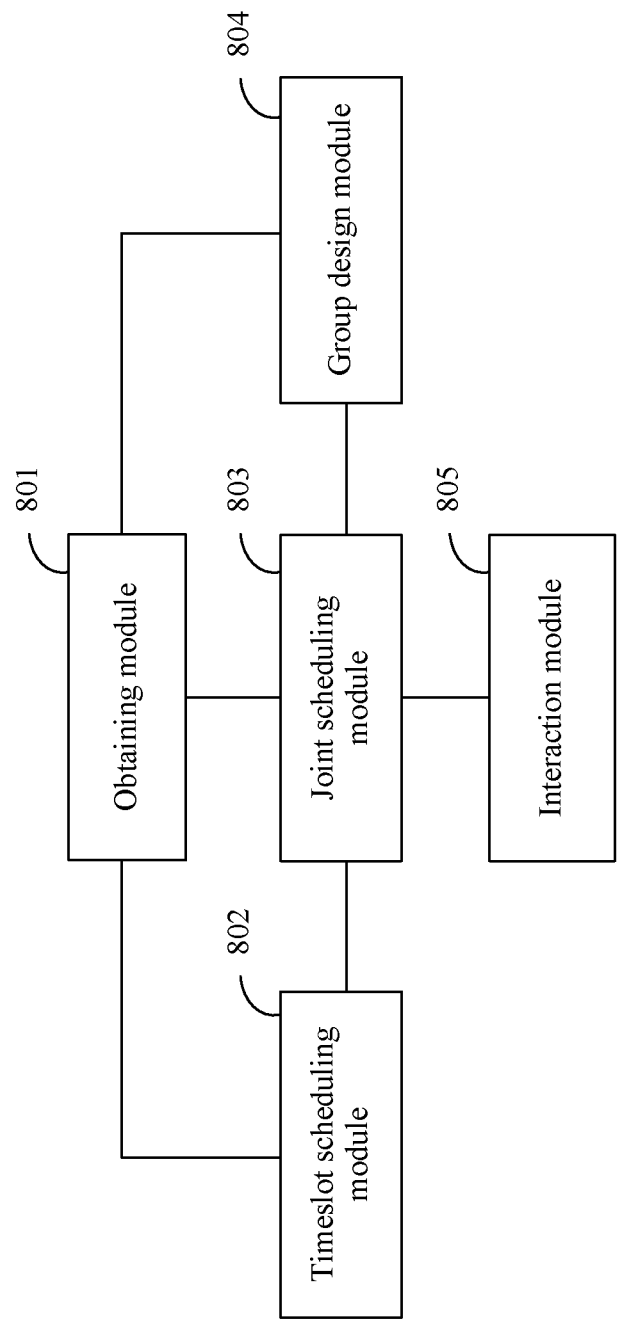
FIG. 8 is a schematic architectural diagram of a resource scheduling system according to a third specific embodiment of the present invention.

In a third specific embodiment, an architecture of a resource scheduling system is shown in FIG. 8.

The resource scheduling system mainly includes an obtaining module 801, a timeslot scheduling module 802, a joint scheduling module 803, a group design module 804, and an interaction module 805.

The obtaining module 801 is mainly configured to obtain information related to resource scheduling, that is, configured to implement a function of step 1 in the first specific embodiment and a function of step 1 in the second specific embodiment.

The timeslot scheduling module 802 is mainly configured to: perform timeslot scheduling, preallocate a transmission opportunity initial value to a subscriber line according to the information obtained by the obtaining module 801, send the preallocation result to the joint scheduling module 803, receive a group transmission solution sent by the joint scheduling module 803, adjust a transmission opportunity in an NOI and a transmission opportunity of each subscriber line group in a DOI according to the group transmission solution and the preallocated transmission opportunity initial value, and send an adjusted group transmission solution to the joint scheduling module 803.

The joint scheduling module 803 is mainly configured to: set a time window in which the subscriber line group is prohibited from being adjusted, skip changing the subscriber line group in the time window, and send the subscriber line group to the timeslot scheduling module 802. Outside the time window, the joint scheduling module is configured to: calculate a DSL system performance indicator corresponding to an alternative group transmission solution, select a group transmission solution according to the calculated performance indicator, and determine whether to perform subscriber line grouping again. Outside the time window, the joint scheduling module is configured to: if subscriber line grouping needs to be performed again, send the received preallocated transmission opportunity initial value to the group design module 804, or if subscriber line grouping does not need to be performed again, send the existing group transmission solution to the timeslot scheduling module 802. Outside the time window, the joint scheduling module is configured to: after receiving the redetermined subscriber line group that is sent by the group design module 804, forward the subscriber line group to the timeslot scheduling module 802 for performing timeslot scheduling. The joint scheduling module is configured to: receive the group transmission solution obtained after the timeslot scheduling module 802 performs the timeslot scheduling, and send the group transmission solution to the interaction module 805.

The group design module 804 is mainly configured to: by using minimizing power consumption costs of a DSL system as a design objective, perform subscriber line grouping according to the preallocated transmission opportunity initial value, save a determined subscriber line group, and send the subscriber line group to the joint scheduling module 803. In some embodiments, the group design module 804 may perform timeslot adjustment after determining the subscriber line group, and send the group transmission solution obtained after the timeslot adjustment to the joint scheduling module 803. A result of subscriber line grouping is regulating a transmission timeslot of each subscriber line. First, a TDD frame is divided into an NOI phase and a DOI phase, and vectoring precoder coefficient matrices have different sizes at different phases, to reduce calculation complexity and power consumption.

The interaction module 805 is mainly configured to send the group transmission solution determined by the joint scheduling module 803 to a module associated with a DRA module, for example, a VCE and an FTU-O.

Based on the foregoing technical solutions, in the embodiments of the present invention, the transmission opportunity initial value preallocated to each subscriber line is determined according to the service traffic information and the transmission capability information of the subscriber line, the TDD frame is divided into the normal operation interval and the discontinuous operation interval according to the preallocated transmission opportunity initial value, the transmission opportunity occupied by each subscriber line in the normal operation interval is determined, and the subscriber line group in the discontinuous operation interval and the transmission opportunity occupied by each subscriber line group in the discontinuous operation interval are determined. Therefore, the group transmission solution is dynamically determined by using the transmission opportunity initial value preallocated to the subscriber line as a constraint, conventional DSL resource scheduling in which only a physical layer parameter and an indicator are considered changes, and the upper-layer service traffic information and the transmission capability information are jointly considered, so that overall performance of the DSL system can be improved.

In addition, the present invention can adjust the group transmission solution in real time according to a variation of the service traffic information, so that a quantity of sent symbols is directly proportional to data traffic, system energy efficiency is improved, and energy consumption of the DSL system is reduced.

Figure 9:
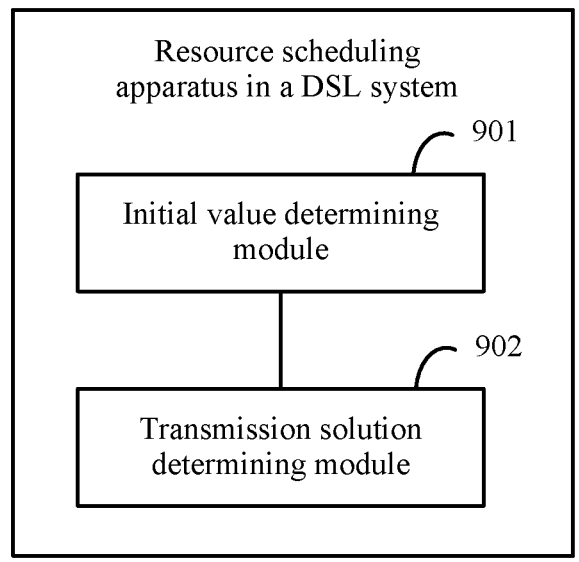
FIG. 9 is a schematic structural diagram of a resource scheduling apparatus in a DSL system according to an embodiment of the present invention.

Based on a same invention conception, an embodiment of the present invention further provides a resource scheduling apparatus in a DSL system. The apparatus is disposed in a network-side device in the DSL system. For specific implementation of the apparatus, refer to some descriptions of the foregoing method embodiments. No repeated description is provided. As shown in FIG. 9, the apparatus includes:

an initial value determining module 901, configured to determine, according to service traffic information of each subscriber line and transmission capability information of each subscriber line, a transmission opportunity initial value allocated to each subscriber line in a time division duplex TDD frame; and a transmission solution determining module 902, configured to determine a group transmission solution according to the transmission opportunity initial value determined by the initial value determining module for each subscriber line.

The transmission solution determining module 902 is configured to:

divide the TDD frame into a normal operation interval and a discontinuous operation interval, determine a transmission opportunity occupied by each subscriber line in the normal operation interval, and determine a subscriber line group in the discontinuous operation interval and a transmission opportunity occupied by each subscriber line group in the discontinuous operation interval, where each subscriber line meets a condition that a difference between a quantity of transmission opportunities allocated to the subscriber line and a transmission opportunity initial value allocated to the subscriber line falls within a preset range.

In a possible implementation, the service traffic information includes at least one of or a combination of a cache queue depth, a service data arrival rate, or an amount of cached service data; and the transmission capability information includes at least a line rate.

In a possible implementation, the initial value determining module is configured to:

for any subscriber line, determine a ratio of a service data arrival rate of the subscriber line to a line rate as a first ratio, determine a ratio of an amount of cached service data of the subscriber line to a cache queue depth as a second ratio, determine a first coefficient according to the first ratio and the second ratio, calculate a product of the obtained first coefficient and a total quantity of symbols included in the TDD frame, and determine, according to the product, a transmission opportunity initial value allocated to the subscriber line.

In a possible implementation, the initial value determining module is configured to:

determine that the transmission opportunity initial value allocated to the subscriber line is not less than the product, and meets a system parameter constraint condition, where the system parameter constraint condition includes at least a minimum quantity of transmission opportunities.

In a possible implementation, the transmission capability information further includes a transmission correctness percentage; and the transmission opportunity initial value allocated to the subscriber line further includes a transmission opportunity required for data retransmission and determined according to the transmission correctness percentage.

In a possible implementation, the transmission solution determining module is configured to:

determine the transmission opportunity occupied by each subscriber line in the normal operation interval, and determine each subscriber line group in the discontinuous operation interval and the transmission opportunity occupied by each subscriber line group in the discontinuous operation interval, where the following conditions are met: a quantity of idle symbols that need to be filled in the TDD frame is smallest; power consumption of a vectoring processor VP chip in the TDD frame is smallest, and power consumption of the VP chip in the TDD frame at a single symbol location is directly proportional to a square of a quantity of subscriber lines that need to participate in transmission at the symbol location; and each subscriber line group performs time-sharing sending, and a combination of all the subscriber line groups occupies all symbol locations in the discontinuous operation interval.

In a possible implementation, the initial value determining module is further configured to:

if service traffic information of at least one subscriber line and/or transmission capability information of at least one subscriber line change/changes, determine, according to changed service traffic information of each subscriber line and changed transmission capability information of each subscriber line, a transmission opportunity initial value reallocated to each subscriber line in the TDD frame.

The transmission solution determining module is further configured to:

determine a group transmission solution after first adjustment according to the transmission opportunity initial value reallocated to each subscriber line and determined by the initial value determining module.

The transmission solution determining module is configured to:

adjust the transmission opportunity occupied by each subscriber line in the normal operation interval, to obtain a transmission opportunity occupied by each subscriber line in the normal operation interval after the first adjustment, and adjust the transmission opportunity occupied by each subscriber line group in the discontinuous operation interval, to obtain a transmission opportunity occupied by each subscriber line group in the discontinuous operation interval after the first adjustment.

In a possible implementation, the transmission solution determining module is configured to:

keep each subscriber line group unchanged, adjust the transmission opportunity occupied by each subscriber line in the normal operation interval, to obtain the transmission opportunity occupied by each subscriber line in the normal operation interval after the first adjustment, and adjust the transmission opportunity occupied by each subscriber line group in the discontinuous operation interval, to obtain the transmission opportunity occupied by each subscriber line group in the discontinuous operation interval after the first adjustment, where the following conditions are met: a quantity of idle symbols that need to be filled in the TDD frame after the first adjustment is smallest; power consumption of the vectoring processor VP chip in the TDD frame after the first adjustment is smallest, and power consumption of the VP chip in the TDD frame at a single symbol location is directly proportional to a square of a quantity of subscriber lines that need to participate in transmission at the symbol location; for each subscriber line, a difference between a quantity of transmission opportunities allocated to the subscriber line after the first adjustment and a transmission opportunity initial value reallocated to the subscriber line falls within the preset range; and each subscriber line group performs time-sharing sending, and a combination of all the subscriber line groups after the first adjustment occupies all symbol locations in the discontinuous operation interval.

In a possible implementation, that a quantity of idle symbols that need to be filled in the TDD frame is smallest is specifically:

calculating a product of a transmission opportunity occupied by any subscriber line in the normal operation interval and a quantity of subscriber lines in the normal operation interval, to obtain a first result;

for each subscriber line group in the discontinuous operation interval, calculating a product of a transmission opportunity occupied by the subscriber line group in the discontinuous operation interval and a quantity of subscriber lines included in the subscriber line group, to obtain a second result; and calculating a sum of the second results corresponding to all the subscriber line groups to obtain a third result, and calculating a sum of the first result and the third result to obtain a fourth result, so that a difference between the fourth result and a total quantity of transmission opportunities allocated to all the subscriber lines is smallest, and the quantity of transmission opportunities allocated to the subscriber line is determined according to the transmission opportunity initial value allocated to the subscriber line.

In a possible implementation, that power consumption of a VP chip in the TDD frame is smallest is specifically:

calculating a product of a square of a total quantity of subscriber lines in the DSL system and a quantity of transmission opportunities occupied by any subscriber line in the normal operation interval, to obtain a fifth result;

for each subscriber line group in the discontinuous operation interval, calculating a product of a square of a quantity of subscriber lines included in the subscriber line group and a quantity of transmission opportunities occupied by the subscriber line group in the discontinuous operation interval, to obtain a sixth result; and calculating a sum of the sixth results corresponding to all the subscriber line groups to obtain a seventh result, so that a sum of the seventh result and the fifth result is smallest.

In a possible implementation, the transmission solution determining module is further configured to:

after determining the group transmission solution after the first adjustment according to the transmission opportunity initial value reallocated to each subscriber line, if a DSL system performance indicator corresponding to the group transmission solution after the first adjustment is better than a preset performance indicator, accept the group transmission solution after the first adjustment.

In a possible implementation, the transmission solution determining module is further configured to:

after determining the group transmission solution after the first adjustment according to the transmission opportunity initial value reallocated to each subscriber line, determine whether a current time is in a time window in which the subscriber line group is prohibited from being adjusted; and if the current time is not in the time window, determine a group transmission solution after second adjustment according to the transmission opportunity initial value reallocated to each subscriber line; or if the current time is in the time window, accept the group transmission solution after the first adjustment.

The determining a group transmission solution after second adjustment includes:

adjusting the transmission opportunity occupied by each subscriber line in the normal operation interval, to obtain a transmission opportunity occupied by each subscriber line in the normal operation interval after the second adjustment, adjusting the subscriber line group in the discontinuous operation interval, to obtain a subscriber line group in the discontinuous operation interval after the second adjustment, and adjusting the transmission opportunity occupied by each subscriber line group in the discontinuous operation interval, to obtain a transmission opportunity occupied by each subscriber line group in the discontinuous operation interval after the second adjustment.

In a possible implementation, the transmission solution determining module is further configured to:

after determining the group transmission solution after the first adjustment according to the transmission opportunity initial value reallocated to each subscriber line, before determining whether the current time is in the time window in which the subscriber line group is prohibited from being adjusted, determine that a DSL system performance indicator corresponding to the group transmission solution after the first adjustment is not better than a preset performance indicator.

In a possible implementation, the transmission solution determining module is further configured to:

after determining the group transmission solution after the second adjustment, determine a better value from a DSL system performance indicator corresponding to the group transmission solution after the first adjustment and a DSL system performance indicator corresponding to the group transmission solution after the second adjustment, and accept a group transmission solution corresponding to the better value.

Figure 10:
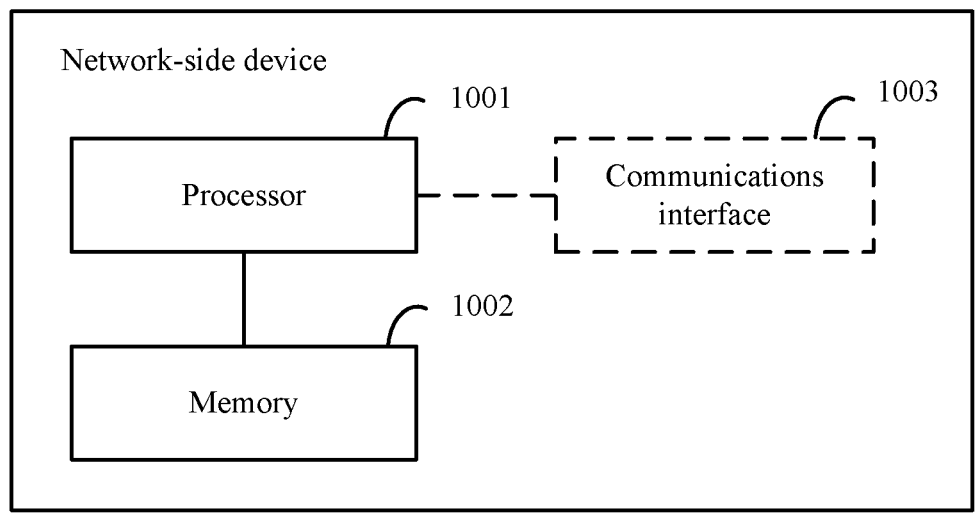
FIG. 10 is a schematic structural diagram of a network-side device according to an embodiment of the present invention.

Based on a same invention conception, an embodiment of the present invention further provides a network-side device. For specific implementation of the network-side device, refer to some descriptions of the foregoing method embodiments. No repeated description is provided. As shown in FIG. 10, the network-side device mainly includes a processor 1001 and a memory 1002. The memory 1002 stores a preset program, and the processor 1001 reads the program stored in the memory 1002, and executes the following process according to the program:

determining, according to service traffic information of each subscriber line and transmission capability information of each subscriber line, a transmission opportunity initial value allocated to each subscriber line in a time division duplex TDD frame; and determining a group transmission solution according to the transmission opportunity initial value of each subscriber line.

The processor 1001 is configured to: divide the TDD frame into a normal operation interval and a discontinuous operation interval, determine a transmission opportunity occupied by each subscriber line in the normal operation interval, and determine a subscriber line group in the discontinuous operation interval and a transmission opportunity occupied by each subscriber line group in the discontinuous operation interval, where each subscriber line meets a condition that a difference between a quantity of transmission opportunities allocated to the subscriber line and a transmission opportunity initial value allocated to the subscriber line falls within a preset range.

In implementation, the processor 1001 is configured to execute the process described in step 301 and step 302. For details, refer to the descriptions of step 301 and step 302 in the foregoing method embodiment. Details are not repeatedly described herein. In addition, the processor 1001 is configured to complete a function of a resource scheduling apparatus in a DSL system, that is, the resource scheduling apparatus in the DSL system is disposed in the processor 1001 of the network-side device in a software form.

In implementation, the network-side device further includes a communications interface 1003, configured to transfer information with an associated module, for example, obtain the service traffic information of each subscriber line and the transmission capability information of each subscriber line from the associated module.

The processor, the memory, and the communications interface are connected by using a bus. A bus architecture may include any quantity of interconnected buses and bridges, and specifically links together various circuits of one or more processors represented by the processor 1001 and a memory represented by the memory 1002. The bus architecture may further link various other circuits such as a peripheral device, a voltage regulator, and a power management circuit. These circuits are well known in the art, and therefore no further description is provided in this specification. A bus interface provides an interface. The processor is responsible for managing the bus architecture and general processing. The memory may store data used when the processor executes an operation.

Based on a same invention conception, an embodiment of the present invention further provides a DSL system, the DSL system includes a network-side device and at least two subscriber lines, and a resource scheduling apparatus in the DSL system is disposed in a processor of the network-side device.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A resource scheduling method in a digital subscriber line (DSL) system, wherein the DSL system comprises a network-side device and at least two subscriber lines, and the method comprises:
   determining, according to service traffic information of each subscriber line and transmission capability information of each subscriber line, a transmission opportunity initial value allocated to each subscriber line in a time division duplex (TDD) frame; and
   determining a group transmission solution according to the transmission opportunity initial value of each subscriber line; and, wherein
   determining the group transmission solution comprises:
      dividing the TDD frame into a normal operation interval and a discontinuous operation interval,
      determining a transmission opportunity occupied by each subscriber line in the normal operation interval, and
      determining a subscriber line group in the discontinuous operation interval and a transmission opportunity occupied by each subscriber line group in the discontinuous operation interval, wherein each subscriber line meets a condition that a difference between a quantity of transmission opportunities allocated to the subscriber line and a transmission opportunity initial value allocated to the subscriber line falls within a preset range.

2. The method according to claim 1, wherein the service traffic information comprises at least one of a cache queue depth, a service data arrival rate, or an amount of cached service data; and
   the transmission capability information comprises at least a line rate.

3. The method according to claim 2, wherein determining, according to service traffic information of each subscriber line and transmission capability information of each subscriber line, a transmission opportunity initial value allocated to each subscriber line in a time division duplex TDD frame comprises:
   for any subscriber line, determining a ratio of a service data arrival rate of the subscriber line to a line rate as a first ratio;
   determining a ratio of an amount of cached service data of the subscriber line to a cache queue depth as a second ratio, determining a first coefficient according to the first ratio and the second ratio, calculating a product of the obtained first coefficient and a total quantity of symbols comprised in the TDD frame, and determining, according to the product, a transmission opportunity initial value allocated to the subscriber line.

4. The method according to claim 3, wherein determining, according to the product, a transmission opportunity initial value allocated to the subscriber line comprises:

determining that the transmission opportunity initial value allocated to the subscriber line is not less than the product, and meets a system parameter constraint condition, wherein the system parameter constraint condition comprises at least a minimum quantity of transmission opportunities.

5. The method according to claim 1, wherein determining a group transmission solution according to the transmission opportunity initial value of each subscriber line comprises:

determining the transmission opportunity occupied by each subscriber line in the normal operation interval, and determining each subscriber line group in the discontinuous operation interval and the transmission opportunity occupied by each subscriber line group in the discontinuous operation interval such that the following conditions are met:

a quantity of idle symbols that need to be filled in the TDD frame is smallest;

power consumption of a vectoring processor (VP) chip in the TDD frame is smallest, and power consumption of the VP chip in the TDD frame at a single symbol location is directly proportional to a square of a quantity of subscriber lines that need to participate in transmission at the symbol location; and each subscriber line group performs time-sharing sending, and a combination of all the subscriber line groups occupies all symbol locations in the discontinuous operation interval.

6. The method according to claim 1, wherein the method further comprises:

if service traffic information of at least one subscriber line and/or transmission capability information of at least one subscriber line change/changes, determining, according to changed service traffic information of each subscriber line and changed transmission capability information of each subscriber line, a transmission opportunity initial value reallocated to each subscriber line in the TDD frame; and determining a group transmission solution after first adjustment according to the transmission opportunity initial value reallocated to each subscriber line; and, wherein determining a group transmission solution after first adjustment comprises:

adjusting the transmission opportunity occupied by each subscriber line in the normal operation interval, obtaining a transmission opportunity occupied by each subscriber line in the normal operation interval after the first adjustment, and adjusting the transmission opportunity occupied by each subscriber line group in the discontinuous operation interval, and obtaining a transmission opportunity occupied by each subscriber line group in the discontinuous operation interval after the first adjustment.

7. The method according to claim 5, wherein determining each subscriber line group in the discontinuous operation interval and the transmission opportunity occupied by each subscriber line group in the discontinuous operation interval such that a quantity of idle symbols that need to be filled in the TDD frame is smallest comprises:

calculating a product of a transmission opportunity occupied by any subscriber line in the normal operation interval and a quantity of subscriber lines in the normal operation interval, to obtain a first result;

for each subscriber line group in the discontinuous operation interval, calculating a product of a transmission opportunity occupied by the subscriber line group in the discontinuous operation interval and a quantity of subscriber lines in the subscriber line group, to obtain a second result; and calculating a sum of the second results corresponding to all the subscriber line groups to obtain a third result, and calculating a sum of the first result and the third result to obtain a fourth result, so that a difference between the fourth result and a total quantity of transmission opportunities allocated to all the subscriber lines is smallest; and, wherein the quantity of transmission opportunities allocated to the subscriber line is determined according to the transmission opportunity initial value of the subscriber line.

8. The method according to claim 5, wherein determining each subscriber line group in the discontinuous operation interval and the transmission opportunity occupied by each subscriber line group in the discontinuous operation interval such that power consumption of a VP chip in the TDD frame is smallest comprises:

calculating a product of a square of a total quantity of subscriber lines in the DSL system and a quantity of transmission opportunities occupied by any subscriber line in the normal operation interval, to obtain a fifth result;

for each subscriber line group in the discontinuous operation interval, calculating a product of a square of a quantity of subscriber lines comprised in the subscriber line group and a quantity of transmission opportunities occupied by the subscriber line group in the discontinuous operation interval, to obtain a sixth result; and calculating a sum of the sixth results corresponding to all the subscriber line groups to obtain a seventh result, so that a sum of the seventh result and the fifth result is smallest.

9. The method according to claim 6, wherein after the determining a group transmission solution after first adjustment according to the transmission opportunity initial value reallocated to each subscriber line, the method further comprises:

if a DSL system performance indicator corresponding to the group transmission solution after the first adjustment is better than a preset performance indicator, accepting the group transmission solution after the first adjustment.

10. The method according to claim 6, wherein after determining a group transmission solution after first adjustment according to the transmission opportunity initial value reallocated to each subscriber line, the method further comprises:

determining whether a current time is in a time window in which the subscriber line group is prohibited from being adjusted;

if the current time is not in the time window, determining a group transmission solution after second adjustment according to the transmission opportunity initial value reallocated to each subscriber line;

if the current time is in the time window, accepting the group transmission solution after the first adjustment; and, wherein determining a group transmission solution after second adjustment comprises:

adjusting the transmission opportunity occupied by each subscriber line in the normal operation interval, to obtain a transmission opportunity occupied by each subscriber line in the normal operation interval after the second adjustment, adjusting the subscriber line group in the discontinuous operation interval, to obtain a subscriber line group in the discontinuous operation interval after the second adjustment, and adjusting the transmission opportunity occupied by each subscriber line group in the discontinuous operation interval, to obtain a transmission opportunity occupied by each subscriber line group in the discontinuous operation interval after the second adjustment.

11. The method according to claim 10, wherein after determining a group transmission solution after first adjustment according to the transmission opportunity initial value reallocated to each subscriber line, before determining whether a current time is in a time window in which the subscriber line group is prohibited from being adjusted, the method further comprises:

determining that a DSL system performance indicator corresponding to the group transmission solution after the first adjustment is not better than a preset performance indicator.

12. A resource scheduling apparatus, and the apparatus comprises a processor and a memory, the memory stores a preset program, and the processor reads the program stored in the memory, and executes the following process according to the program:

determine, according to service traffic information of each subscriber line and transmission capability information of each subscriber line, a transmission opportunity initial value allocated to each subscriber line in a time division duplex (TDD) frame;

determine a group transmission solution according to the transmission opportunity initial value determined by the initial value determining module for each subscriber line;

divide the TDD frame into a normal operation interval and a discontinuous operation interval;

determine a transmission opportunity occupied by each subscriber line in the normal operation interval; and determine a subscriber line group in the discontinuous operation interval and a transmission opportunity occupied by each subscriber line group in the discontinuous operation interval, wherein each subscriber line meets a condition that a difference between a quantity of transmission opportunities allocated to the subscriber line and a transmission opportunity initial value allocated to the subscriber line falls within a preset range.

13. The apparatus according to claim 12, wherein the service traffic information comprises at least one of a cache queue depth, a service data arrival rate, or an amount of cached service data; and the transmission capability information comprises at least a line rate.

14. The apparatus according to claim 13, wherein the processor is configured to:

for any subscriber line, determine a ratio of a service data arrival rate of the subscriber line to a line rate as a first ratio;

determine a ratio of an amount of cached service data of the subscriber line to a cache queue depth as a second ratio, determine a first coefficient according to the first ratio and the second ratio, calculate a product of the obtained first coefficient and a total quantity of symbols comprised in the TDD frame, and determine, according to the product, a transmission opportunity initial value allocated to the subscriber line.

15. The apparatus according to claim 14, wherein the processor is configured to:

determine that the transmission opportunity initial value allocated to the subscriber line is not less than the product, and meets a system parameter constraint condition, wherein the system parameter constraint condition comprises at least a minimum quantity of transmission opportunities.

16. The apparatus according to claim 12, wherein the processor is configured to:

determine the transmission opportunity occupied by each subscriber line in the normal operation interval, and determine each subscriber line group in the discontinuous operation interval and the transmission opportunity occupied by each subscriber line group in the discontinuous operation interval such that the following conditions are met:

a quantity of idle symbols that need to be filled in the TDD frame is smallest;

power consumption of a vectoring processor (VP) chip in the TDD frame is smallest, and power consumption of the VP chip in the TDD frame at a single symbol location is directly proportional to a square of a quantity of subscriber lines that need to participate in transmission at the symbol location; and each subscriber line group performs time-sharing sending, and a combination of all the subscriber line groups occupies all symbol locations in the discontinuous operation interval.

17. The apparatus according to claim 12, wherein the processor is configured to:

if service traffic information of at least one subscriber line and/or transmission capability information of at least one subscriber line change/changes, determine, according to changed service traffic information of each subscriber line and changed transmission capability information of each subscriber line, a transmission opportunity initial value reallocated to each subscriber line in the TDD frame;

determine a group transmission solution after first adjustment according to the transmission opportunity initial value reallocated to each subscriber line and determined by the initial value determining module;

adjust the transmission opportunity occupied by each subscriber line in the normal operation interval, to obtain a transmission opportunity occupied by each subscriber line in the normal operation interval after the first adjustment; and adjust the transmission opportunity occupied by each subscriber line group in the discontinuous operation interval, to obtain a transmission opportunity occupied by each subscriber line group in the discontinuous operation interval after the first adjustment.

18. The apparatus according to claim 16, wherein determining each subscriber line group in the discontinuous operation interval and the transmission opportunity occupied by each subscriber line group in the discontinuous operation interval such that a quantity of idle symbols that need to be filled in the TDD frame is smallest is specifically:
  calculating a product of a transmission opportunity occupied by any subscriber line in the normal operation interval and a quantity of subscriber lines in the normal operation interval, to obtain a first result;
  for each subscriber line group in the discontinuous operation interval, calculating a product of a transmission opportunity occupied by the subscriber line group in the discontinuous operation interval and a quantity of subscriber lines comprised in the subscriber line group, to obtain a second result; and
  calculating a sum of the second results corresponding to all the subscriber line groups to obtain a third result, and calculating a sum of the first result and the third result to obtain a fourth result, so that a difference between the fourth result and a total quantity of transmission opportunities allocated to all the subscriber lines is smallest, and the quantity of transmission opportunities allocated to the subscriber line is determined according to the transmission opportunity initial value of the subscriber line.

19. The apparatus according to claim 17, wherein the processor is configured to:
  after determining the group transmission solution after the first adjustment according to the transmission opportunity initial value reallocated to each subscriber line, if a DSL system performance indicator corresponding to the group transmission solution after the first adjustment is better than a preset performance indicator, accept the group transmission solution after the first adjustment.

20. The apparatus according to claim 17 wherein the processor is configured to:
  after determining the group transmission solution after the first adjustment according to the transmission opportunity initial value reallocated to each subscriber line, determine whether a current time is in a time window in which the subscriber line group is prohibited from being adjusted;
  if the current time is not in the time window, determine a group transmission solution after second adjustment according to the transmission opportunity initial value reallocated to each subscriber line;
  if the current time is in the time window, accept the group transmission solution after the first adjustment; and, wherein determining a group transmission solution after second adjustment comprises:
    adjusting the transmission opportunity occupied by each subscriber line in the normal operation interval, to obtain a transmission opportunity occupied by each subscriber line in the normal operation interval after the second adjustment,
    adjusting the subscriber line group in the discontinuous operation interval, to obtain a subscriber line group in the discontinuous operation interval after the second adjustment, and
    adjusting the transmission opportunity occupied by each subscriber line group in the discontinuous operation interval, to obtain a transmission opportunity occupied by each subscriber line group in the discontinuous operation interval after the second adjustment.

* * * * *